(12) United States Patent
Donohoe et al.

(10) Patent No.: US 10,945,373 B2
(45) Date of Patent: Mar. 16, 2021

(54) HARVESTER FEEDER

(71) Applicant: Deere and Company, Moline, IL (US)

(72) Inventors: Adam J. Donohoe, Bettendorf, IA (US); Michael T. Meschke, Silvis, IL (US)

(73) Assignee: Deere & Company, Moline, IL (US)

( * ) Notice: Subject to any disclaimer, the term of this patent is extended or adjusted under 35 U.S.C. 154(b) by 219 days.

(21) Appl. No.: 16/176,887

(22) Filed: Oct. 31, 2018

(65) Prior Publication Data
US 2020/0128746 A1 Apr. 30, 2020

(51) Int. Cl.
*A01D 61/00* (2006.01)
*A01D 61/02* (2006.01)
*A01F 12/10* (2006.01)
*B65G 23/44* (2006.01)

(52) U.S. Cl.
CPC .......... *A01D 61/008* (2013.01); *A01D 61/02* (2013.01); *A01F 12/10* (2013.01); *B65G 23/44* (2013.01)

(58) Field of Classification Search
CPC ...... A01D 61/008; A01D 61/02; A01D 57/20; B65G 23/44; A01F 12/10
See application file for complete search history.

(56) References Cited

U.S. PATENT DOCUMENTS

| | | | | |
|---|---|---|---|---|
| 2,841,945 A | * | 7/1958 | Brenner | A01D 41/00 56/122 |
| 3,170,564 A | * | 2/1965 | Gatto | B29C 48/355 198/626.5 |
| 3,468,409 A | * | 9/1969 | Ball | B65G 37/00 198/626.6 |
| 3,474,893 A | * | 10/1969 | Morine | B65G 21/00 198/300 |
| 3,699,753 A | * | 10/1972 | Peak | A01D 61/008 56/14.5 |
| 3,854,572 A | * | 12/1974 | Maiste | A01D 41/142 198/728 |

(Continued)

FOREIGN PATENT DOCUMENTS

| | | | |
|---|---|---|---|
| EP | 0448844 A1 * | 10/1991 | ............. A01D 41/14 |
| EP | 1849352 A1 | 10/2007 | |
| EP | 3590321 A1 | 1/2020 | |

OTHER PUBLICATIONS

European Search Report issued in counterpart European Patent Application No. 19205932.7 dated Mar. 31, 2020 (9 pages).

*Primary Examiner* — Arpad Fabian-Kovacs
(74) *Attorney, Agent, or Firm* — Rathe Lindenbaum LLP

(57) ABSTRACT

A harvester feeder may include a housing forming a crop passage having a width and a conveyor supported by the housing to extend above crops being conveyed along the crop passage. The conveyor may include a frame, at least one forward tensioner, at least one drive sprocket and at least one belt about the forward tensioner and the drive sprocket. In one implementation, the at least one belt forms a substantially uninterrupted crop engaging belt surface extending across a majority of the width. In one implementation, each belt has an upper portion and a lower portion with the lower portion being adjacent the crop passage, wherein a crop massager extends between the upper portion and the lower portion and resume only presses the lower portion of the continuous belt towards the crop passage.

19 Claims, 17 Drawing Sheets

(56) References Cited

U.S. PATENT DOCUMENTS

| | | | | |
|---|---|---|---|---|
| 3,863,431 | A * | 2/1975 | Fowler | A01D 45/10 56/502 |
| 3,971,390 | A * | 7/1976 | McDuffie | A01F 12/16 460/106 |
| 4,038,809 | A * | 8/1977 | Arnould | A01D 57/20 56/124 |
| 4,128,952 | A * | 12/1978 | Duke | B65G 23/44 198/813 |
| 4,266,391 | A * | 5/1981 | McDuffie | A01D 41/16 56/14.5 |
| 4,266,392 | A * | 5/1981 | Knepper | A01D 41/14 56/14.5 |
| 4,294,062 | A * | 10/1981 | Seymour | A01F 12/16 460/2 |
| 4,430,847 | A * | 2/1984 | Tourdot | A01D 41/1274 474/1 |
| 4,707,972 | A * | 11/1987 | Knepper | A01D 41/14 460/16 |
| 4,879,868 | A * | 11/1989 | Love | A01D 41/142 56/11.2 |
| 5,026,326 | A * | 6/1991 | Pollich | F16H 7/12 198/813 |
| 5,497,605 | A | 3/1996 | Underwood et al. | |
| 5,634,551 | A * | 6/1997 | Francioni | B65B 35/44 198/460.1 |
| 5,904,237 | A * | 5/1999 | Sander | B65H 29/12 198/502.2 |
| 6,116,008 | A * | 9/2000 | Digman | A01D 41/16 56/15.8 |
| 6,226,967 | B1 * | 5/2001 | Staiger | A01D 43/077 56/14.5 |
| 6,330,782 | B1 * | 12/2001 | Digman | A01D 41/16 56/14.5 |
| 6,516,941 | B1 * | 2/2003 | Buhne | B65G 23/44 198/314 |
| 6,997,307 | B2 * | 2/2006 | Iseli | B65G 23/44 198/813 |
| 7,600,362 | B2 * | 10/2009 | Wernsmann | A01D 61/008 56/14.5 |
| 7,766,736 | B2 * | 8/2010 | Ramp | A01F 12/10 460/16 |
| 9,144,197 | B2 * | 9/2015 | Gahres | A01D 57/20 |
| 9,301,450 | B2 * | 4/2016 | Boyd | A01D 61/008 |
| 9,485,915 | B2 * | 11/2016 | Rittershofer | A01D 41/14 |
| 9,750,190 | B2 * | 9/2017 | Mossman | A01D 61/008 |
| 10,149,437 | B2 * | 12/2018 | Van Overschelde | A01F 12/10 |
| 10,653,066 | B2 * | 5/2020 | Peters | B65G 15/52 |
| 2006/0016165 | A1 * | 1/2006 | Wernsmann | A01D 61/008 56/16.6 |
| 2007/0251203 | A1 * | 11/2007 | Coers | A01D 61/02 56/181 |
| 2013/0313077 | A1 * | 11/2013 | Boyd | A01D 61/008 198/617 |
| 2015/0366139 | A1 * | 12/2015 | Rittershofer | A01F 12/46 460/114 |
| 2017/0251606 | A1 * | 9/2017 | Van Overschelde | A01D 41/16 |

* cited by examiner

HARVESTER FEEDER

BACKGROUND

Harvesters gather and process crops. Such harvesters often include a feeder that conveys the crop, after it has been separated from the growing medium, into threshing or other crop processing components of the harvester. In some harvesters, the feeder is located at a central rearward location with respect to a wider transversely extending harvesting head.

BRIEF DESCRIPTION OF THE DRAWINGS

FIGS. 11A, 11B and 11C are side views of the example harvester feeder of FIG. 9 in different states.

Figure 1:
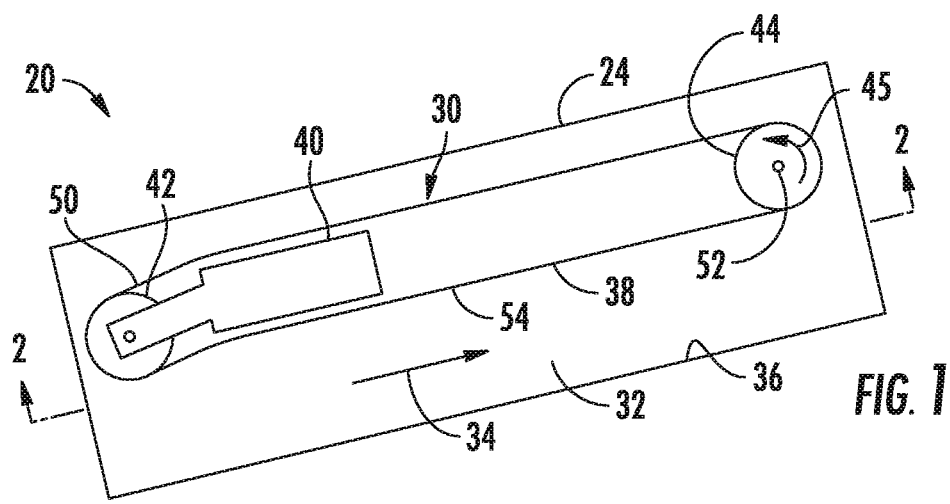
FIG. 1 is a side view schematically illustrating portions of an example harvester feeder.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example harvesters, harvester feeders and methods that convey crops in a gentler manner, reducing damage to the crops as they are being conveyed to crop threshing or processing components of the harvester. Disclosed herein are example harvesters, harvester feeders and methods that automatically adapt to varying crop conditions to convey crops in a shorter time with a lesser likelihood of the harvester feeder becoming plugged with excessive crop material.

In some implementations, the example harvesters, harvester feeders and methods utilize at least one belt that is driven above crops being conveyed along a crop passage formed by the harvester feeder. The at least one belt forms a substantially uninterrupted crop engaging belt surface that extends across a majority of a width of the crop passage. For purposes of this disclosure, the phrase "substantially uninterrupted" shall mean that, in those implementations where the at least one belt comprises multiple belts, adjacent parallel belts have side edges that are spaced apart from one another by no greater than 2 inches. Because the crop engaging belt surface is substantially uninterrupted across a majority of the width of the crop passage, the crops are more gently conveyed with less damage as compared to harvester feeders employing chains. In some implementations, the substantially uninterrupted crop engaging belt surface extends across a good yet greater portion of the width of the crop passage, extending across at least 75% of the width of the crop passage or at least 90% of the width of the crop passage.

In some implementations, the example harvester, harvester feeders and methods include a belt that loops around and is supported by a forward tensioner, sometimes in the form a floating drum, and a drive sprocket. Such belts have an upper portion spanning between the forward tensioner and the drive sprocket and a lower portion spanning between the floating drum and the drive sprocket, wherein the lower portion is adjacent to the crop passage formed or defined by the harvester feeder. In such implementations, a crop massager is located between the upper portion and the lower portion. The crop massager resiliently presses the lower portion of the continuous belt towards the crop passage, massaging crops on the other side of the belt. Such massaging serves to spread out lumps of crop material passing between a floor of the crop passage and the belt, reducing the occurrences of jams, wherein the crop material plugs the harvester feeder. As a result, such a harvester may experience less damage and less downtime due to such crop material jams.

In some implementations where the harvester feeder has a substantially uninterrupted crop engaging belt surface across a majority of the width of the harvester feeder, if not more, the harsher feeder may be more susceptible to such plugging of crop material. The provision of such crop massagers with such a substantially uninterrupted crop engaging belt surface may be especially beneficial. In some implementations, the crop massagers may be in the form of at least one skid. In other implementations, crop massagers may be in the form of either wheels, or an array of either wheels. In some implementations, the skids or the idler wheels are is only biased towards the crop passage by suspension member in the form of a torsion spring, a compression spring or a pneumatic spring or shock. In some implementations, the skids or the idler wheels are pivotably supported by a frame or movement towards and away from the crop passage.

Disclosed herein is an example harvester feeder comprising a housing forming a crop passage having a width and a conveyor supported by the housing to extend above crops being conveyed along the crop passage. The conveyor may comprise a frame, at least one forward tensioner supported by the frame, at least one sprocket, and at least one belt about the at least one forward tensioner and the at least one drive sprocket. The at least one belt may form a substantially uninterrupted crop engaging belt surface extending across a majority of the width.

Disclosed herein is an example harvester feeder that may comprise a housing forming a crop passage and a conveyor supported by the housing to extend above crops being conveyed along the crop passage. The conveyor may comprise a frame, a forward tensioner supported by the frame, a drive sprocket and a belt about the forward tensioner and the drive sprocket The belt has an upper portion spanning between the forward tensioner and the drive sprocket and a lower portion spanning between the forward tensioner and the drive sprocket. The lower portion is adjacent the crop passage. The example harvester feeder additionally comprises a crop massager between the upper portion and the lower portion, wherein the crop massager resiliently presses the lower portion of the continuous belt towards the crop passage.

Disclosed herein is an example method for conveying crops with a harvester feeder. The example method may comprise directing the crop material to an inlet of a crop passage of a harvester feeder, driving a belt having a lower portion adjacent the crop passage and resiliently pressing against an inner surface of the lower portion to resiliently press an outer surface of the lower portion against the crop material in the crop passage.

FIG. 1 schematically illustrates portions of an example harvester feeder 20, sometimes referred to as a harvester or combine feeder house. Harvester feeder 20 is to be employed in a harvester, wherein harvester feeder 20 conveys crop material, such as corn, wheat, soybeans and the like, into the harvester where the crop material is further processed, such as being threshed or cleaned. In one implementation, harvester feeder 20 extends at a central point behind a harvester head, wherein crops separated from a growing medium or transversely conveyed to a central gathering point at which harvester feeder 20 further conveys the gather crop material in a rearward direction into the harvester. Harvester feeder 20 convey crops in a gentler manner, reducing damage to the crops as they are being conveyed to crop threshing or processing components of the harvester. Harvester feeder 20 conveys crop materials along a crop passage with an overhead belt that is sufficiently expansive so as to efficiently convey the crops without damaging the crops. Harvester feeder 20 comprises housing 24 and conveyor 30.

Housing 24 comprises a framework and set of panels that form a crop passage 32 through and along which crops are conveyed in a direction as indicated by arrow 34. In one implementation, crop passage 32 has a lower boundary formed by a floor 36 and an upper boundary 38 formed by conveyor 30. In one implementation, floor 36 is stationary. In another implementation, floor 36 may itself comprise a conveying mechanism such as a chain or belt.

Conveyor 30 is supported by housing 24 and extends above the crops being conveyed along crop passage 32. Conveyor 30 comprises frame 40, at least one forward tensioner 42, at least one drive sprocket 44 and at least one belt 50. Frame 40 (schematically shown) supports forward tensioner 42.

Forward tensioner 42 is located within the loop of belt 50 and exerts forces on an interior surface of the loop to place belt 50 in tension. In the example illustrated, forward tensioner 42 is movably supported to adjust tensioning about 50 so as to maintain belt 50 within a predetermined range of tensions. In one implementation, forward tensioner 42 comprises a floating drum, a cylinder or drum rotatably supported by frame 40 and also translatable in at least the fore-aft direction. In some implementations, forward tensioner 42, in the form of a floating drum, is additionally actively supported by frame 40 to move in a vertical direction.

Drive sprocket 44 comprises a sprocket or other member in engagement with belt 50 to rotatably drive the loop of belt 50 in a direction indicated by arrow 45 and about forward tensioner 42. In one implementation, drive sprocket 44 may comprise external teeth which interact with corresponding logs or pockets in belt 50. In the example illustrated, drive sprocket 44 is located at a rear of conveyor 30, proximate to the interior crop processing components or threshing components of harvester 20, whereas forward tensioner 42 is at a forward or front-end of conveyor 30. In other implementations, this relationship may be reversed.

Belt 50 comprises a sheet or panel of a flexible bendable material wrapped about forward tensioner 42 and drive sprocket 44 in an unending loop. In one implementation, belt 50 is formed from an elastomeric, rubber or rubber-like material. In one implementation, belt 50 may carry bars, cleats or other structures along its exterior surface for engaging crop material within crop patch 32. Belt 50, alone or in combination with other belts 50, forms a substantially uninterrupted crop engaging belt surface 54 which forms the upper boundary 38 of crop passage 32 and which extends across a majority of a width (as measured in a direction parallel to the rotational axis 52 of drive sprocket 44) of the crop passage 32. In some implementations, crop engaging belt surface 54 extends across at least 75% of the width of crop passage 32. In yet other implementations, crop engaging belt surface 54 extends across at least 90% of the width of crop passage 32. As a result of its expansive extent, crop engaging belt surface 54 is able to convey crops in a quieter and gentler manner as compared to typical chain conveyors.

Figure 2:
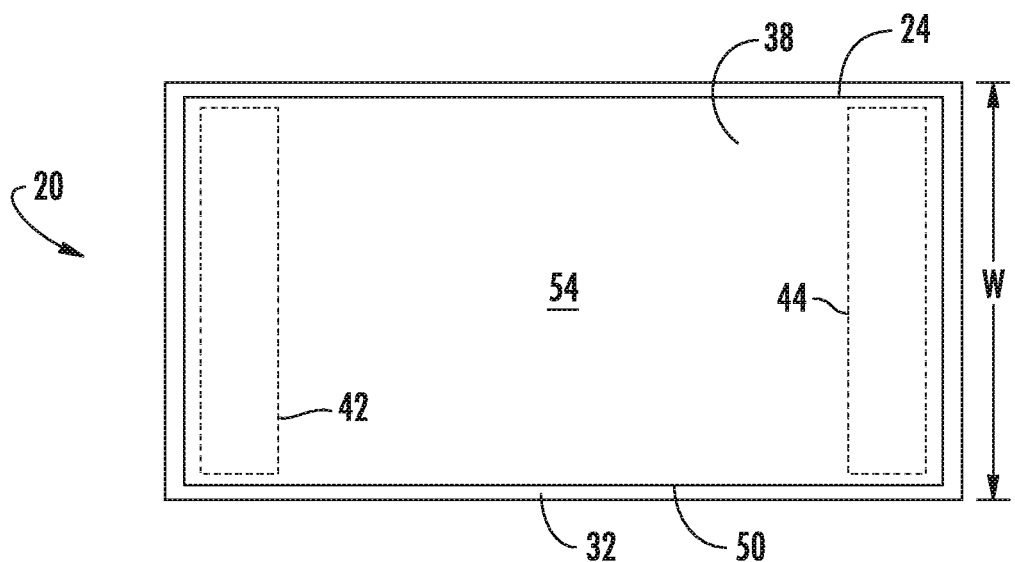
FIG. 2 is a top view of the example harvester feeder of FIG. 1.

FIG. 2 is a bottom view of feeder 20 taken along line 2-2 of FIG. 1. As shown by FIG. 2, in one implementation, feeder 20 comprises a single forward tensioner 42, a single drive sprocket 44 and a single belt 50. In the example illustrated in FIG. 2, belt 50 extends across over 90% of the width W of the crop passage 32.

Figure 3:
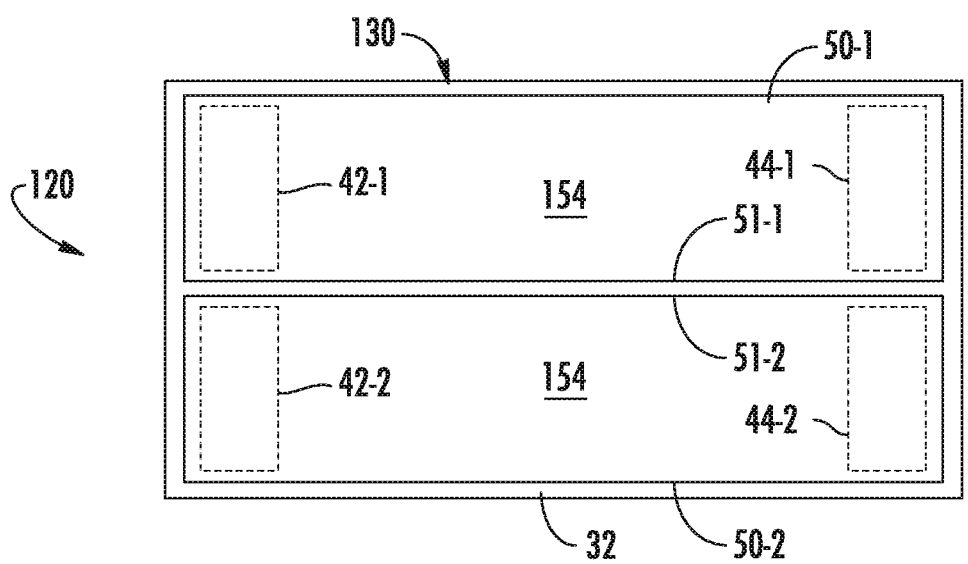
FIG. 3 is a top view of portions of an example harvester feeder.

FIG. 3 is a bottom view of harvester feeder 120 taken along line 2-2 of FIG. 1. Harvester feeder 120 is similar to harvester feeder 20 in all respects except that harvester feeder 120 comprises a conveyor 130 formed by a plurality of parallel or side-by-side forward tensioners 42-1, 42-2 (collectively referred to as tensioners 42), drive sprockets 44-1, 44-2 (collectively referred to as sprockets 44) and belts 50-1, 50-2 (collectively referred to as belts 50). Those remaining components of harvester feeder 120 which correspond to components of harvester feeder 20 are numbered similarly.

Forward tensioner 42-1 and drive sprocket 44-1 cooperate to support belt 50-1 in tension along and across a length of crop passage 32. Likewise, forward tensioner 42-2 and drive sprocket 44-2 cooperate to support belt 50-2 in tension along and across a length of crop passage 32. Belts 50-1 and 50-2 cooperate to form a substantially uninterrupted crop engaging belt surface 154. As defined above, crop engaging belt surface 154 is substantially uninterrupted in that any gaps or spaces along its width between consecutive parallel belts 50 is no greater than 2 inches. Thus, in the example illustrated, the opposing side edges 51-1 and 51-2 of belts 50-1 and 50-2, respectively, are space by no greater than 2 inches. This spacing may have varying values no greater than 2 inches depending upon the characteristics of the crop material being conveyed. This spacing reduces the likelihood of crop material gathering or collecting in such gaps and provides a more continuous surface 154 for conveying crop material in a gentler manner.

Figure 4:
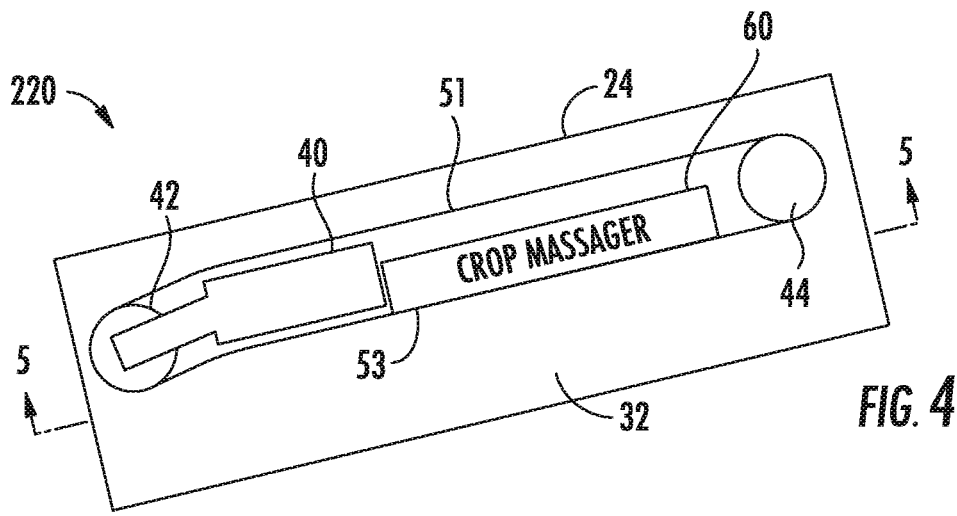
FIG. 4 is a side view illustrating portions of an example harvester feeder.

FIG. 4 is a side view schematically illustrating portions of an example harvester feeder 220. Harvester feeder 220 is to be employed in a harvester, wherein harvester feeder 220 conveys crop material, such as corn, wheat, soybeans and the like, into the harvester where the crop material is further processed, such as being threshed or cleaned. In one implementation, harvester feeder 220 extends at a central point behind a harvester head, wherein crops separated from a growing medium or transversely conveyed to a central gathering point at which harvester feeder 220 further conveys the gather crop material in a rearward direction into the harvester. As will be described hereafter, harvester feeder 220 automatically adapts to varying crop conditions to convey crops in a shorter time with a lesser likelihood of the harvester feeder becoming plugged with excessive crop material. In one implementation, harvester feeder 220 is similar to harvester feeder 20 or harvester feeder 120 except that harvester feeder 120 additionally comprises crop massager 60.

Crop massager 60 (schematically illustrated) comprises at least one crop massaging unit or element that resiliently presses against an inner surface of a lower portion of belt 50 to resiliently press an outer surface of the lower portion of belt 50 against crop material in crop passage 32. As shown by FIG. 4, belt 50 has an upper portion 51 that spans between forward tensioner 42 and drive sprocket 44 and a lower portion 53 that spans between forward tensioner 42 and drive sprocket 44 adjacent crop passage 32). Crop massager 60 is generally located between the upper portion 51 and the lower portion 53.

Because crop massager 60 resiliently presses the lower portion 53 against the crops within crop passage 32, crop massager 60 spreads out or flattens any lumps or bunches of crop material in crop passage 32. At the same time, the resilient nature of crop massager 60 allows crop massager 60 to automatically adjust and respond to different volumes of crop material currently passing through crop passage 32. In one implementation, crop massager 60 utilizes Springs, such as torsion springs or compression springs to apply resilient force to the lower portion 53 of belt 50. In some implementations, crop massager 60 utilizes hydraulic or pneumatic cylinder-pistons or shocks to apply such resilient forces.

Figure 5:
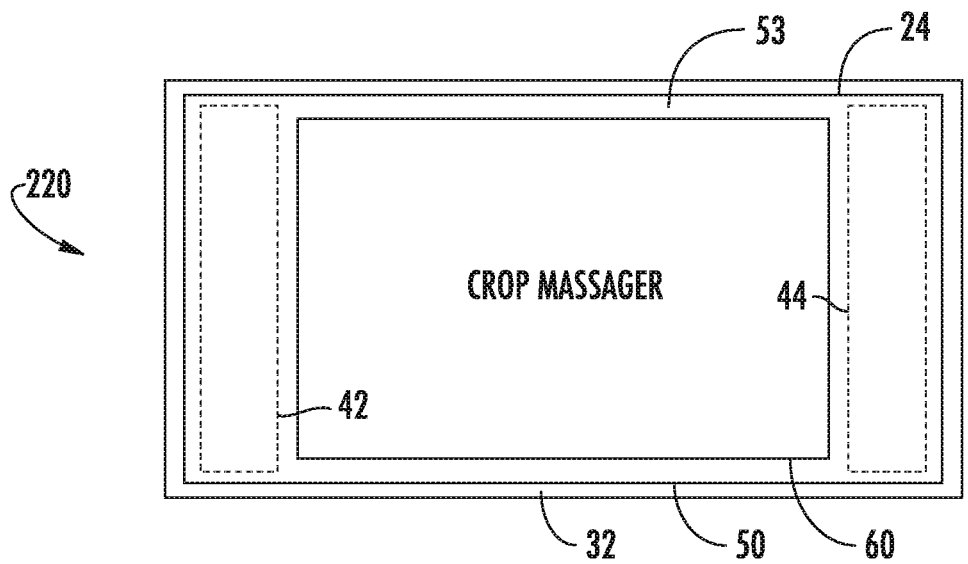
FIG. 5 is a top view of the example harvester feeder of FIG. 4.

As shown by FIG. 5, in one implementation, harvester feeder 220 is similar to harvester feeder 20 described above in that harvester feeder 220 may comprise a single forward tensioner 42, a single drive sprocket 44 and a single belt 50. In one up limitation, the single belt 50 provides a substantially uninterrupted crop engaging belt surface across at least a majority of the width of crop passage 32. In such an implementation, crop massager 60 may apply such resilient forces to the lower portion 53 of belt 50 across a total area that encompasses at least 50% of the area of belt 50 between forward tensioner 42 and drive sprocket 44. For example, in one implementation, crop massager 60 may comprise a plurality of massaging elements or units which are spaced at various locations opposite to lower portion 53 in which form boundaries of a region or area that is at least 50% of the area of lower portion 53.

Figure 6:
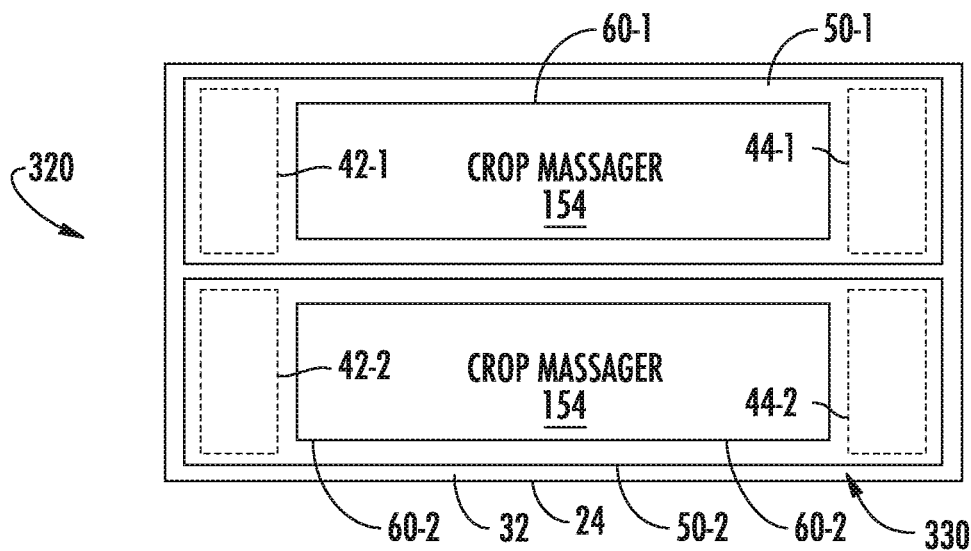
FIG. 6 is a top view illustrating portions of an example harvester feeder.

FIG. 6 schematically illustrates portions of an example harvester feeder 320. Harvester feeder 320 is similar to harvester feeder 120 described above except that harvester feeder 320 comprises a crop conveyor 330 comprising crop massagers 60-1 and 60-2 (collectively referred to as crop massager 60) opposite to the lower portions 53 of each of belts 50-1 and 50-2. Those remaining components of harvester feeder 320 which correspond to components of harvester feeder 120 are numbered similarly. Each of crop massagers 60 is similar to crop massager 60 described above. Although each of the crop massager 60 described above with respect to feeders 220 and 320 is illustrated as being positioned opposite to at least one belt 50 that forms or impart forms a substantially uninterrupted crop engaging belt surface that extends over at least 50% (at least over a majority) of a width of crop passage 32, in other implementations, crop massagers 60 may be utilized in other conveyors, wherein crop massager 60 are positioned opposite to lower portions of belts extending over a crop passage, but which do not form a substantially uninterrupted crop engaging belt surface that extends over at least a majority of a width of the crop passage.

Figure 7:
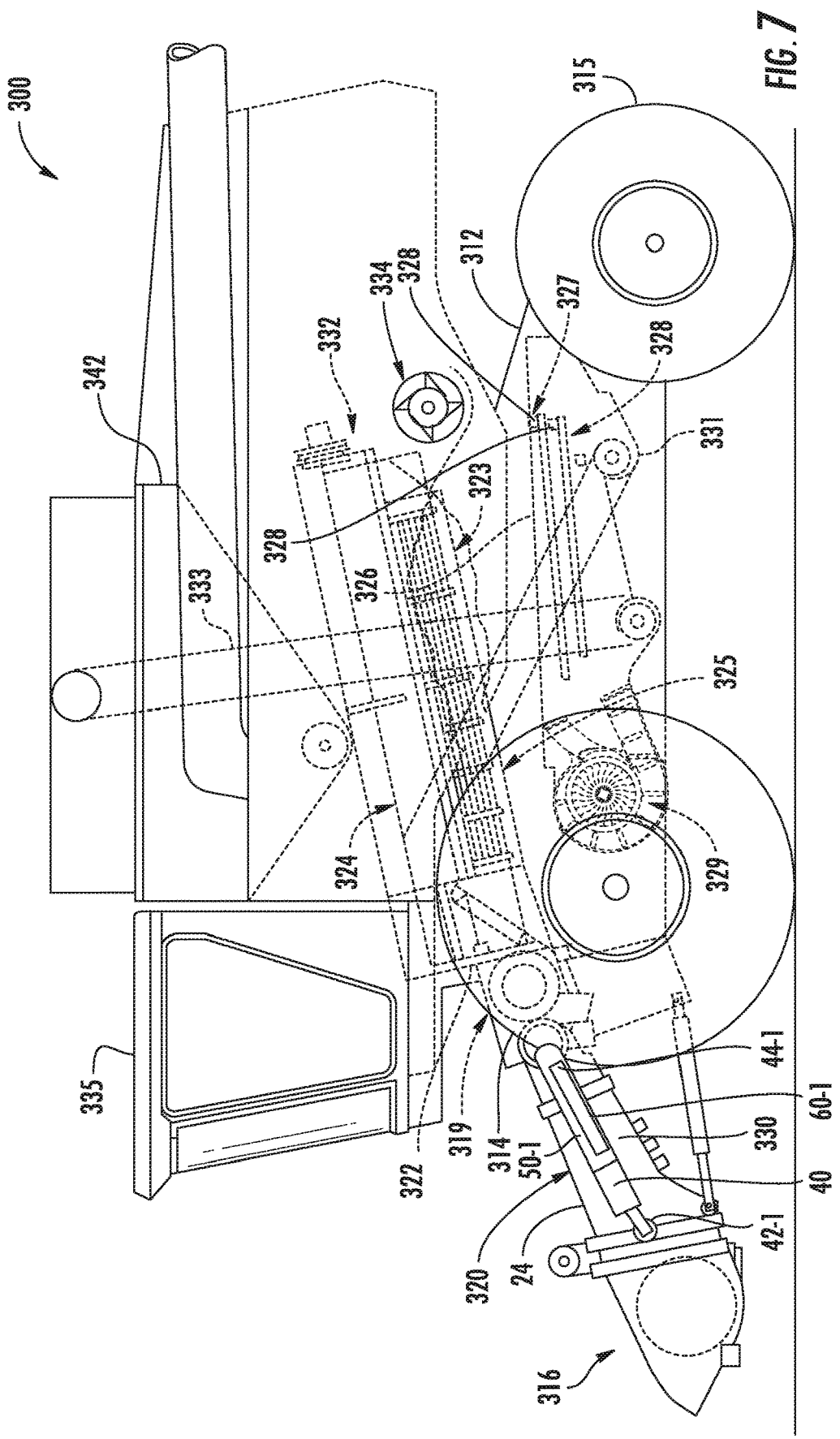
FIG. 7 is a side view of a harvester incorporating the example harvester feeder of FIG. 6.

FIG. 7 is a side view schematically illustrating harvester feeder 320 incorporated as part of a combine harvester 300. Harvester 300 comprises a main frame 312 having wheel structure including front and rear ground engaging wheels 314 and 315 supporting the main frame for forward movement over a field of crop to be harvested. The front wheels 314 are driven by an electronically controlled hydrostatic transmission.

As further shown by FIG. 7, harvester 300 further comprises a vertically adjustable header or harvesting platform or head 316 that is used for harvesting a crop and directing it to harvester feeder 320. The harvester feeder 320 is pivotally connected to the frame 312 and includes the conveyor 330 for conveying the harvested crop to a beater 319. The beater 319 directs the crop upwardly through an inlet transition section 322 to a rotary cleaning and separating assembly 324. In other implementations, other orientations and types of cleaning structures and other types of headers 316, such as transverse frame supporting individual row units, are utilized.

The rotary cleaning and separating assembly 324 threshes and separates the harvested crop material. Grain and chaff fall through a concave 325 and separation grates 323 on the bottom of the assembly 324 to a cleaning system 326, and are cleaned by a chaffer 327, sieve 328 and air fan 329. The cleaning system 326 removes the chaff and directs the clean grain to elevator 333. Clean grain elevator 333 conveys the grain to tank 342. The clean grain in the tank 342 can be unloaded into a grain cart or truck by unloading auger. Tailings fall into the return elevator or auger 331 and are conveyed to the rotor 337 where they are threshed a second time.

Threshed and separated straw is discharged from the rotary cleaning and separating assembly 324 through an outlet 332 to a discharge beater 334. The discharge beater 334, in turn, propels the straw out the rear of the combine. It should be noted that the discharge beater 334 could also discharge crop material other than grain directly to a straw chopper. The operation of the combine is controlled from an operator's cab 335.

Figure 8:
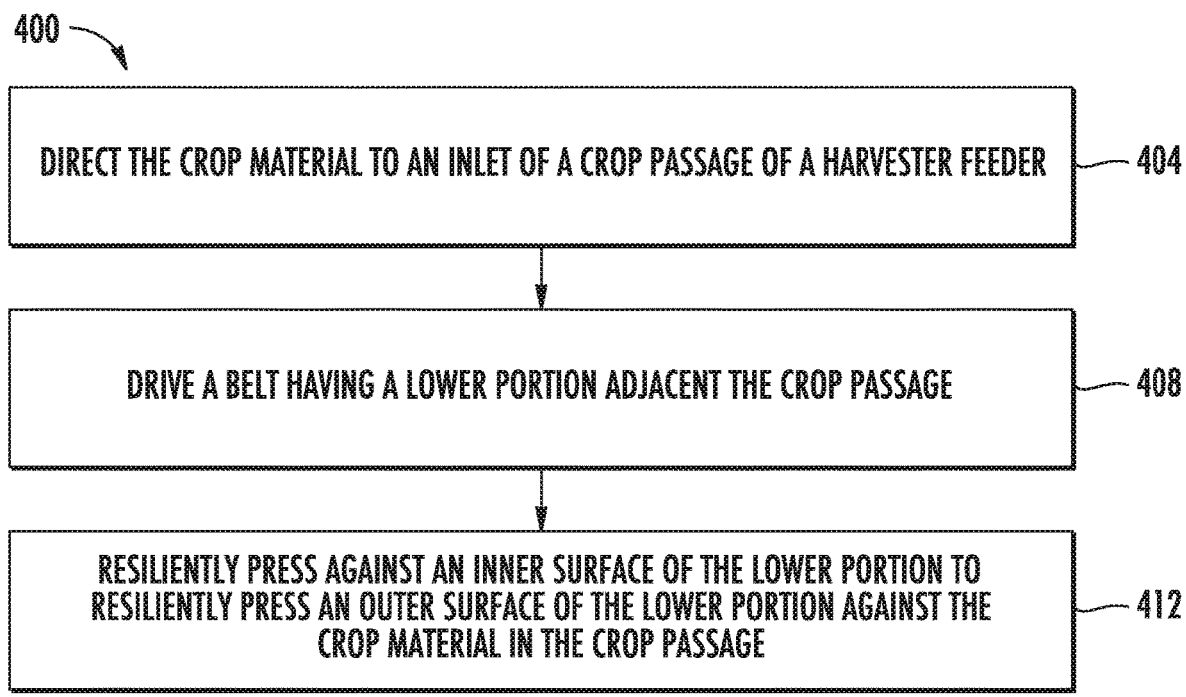
FIG. 8 is a flow diagram of an example method for feeding crop material with a harvester feeder.

FIG. 8 is a flow diagram of an example method 400 for conveying crops with a harvester feeder. Method 400 compresses and flattens agglomerations of crop material in the crop passage to spread out such agglomerations and reduce plugging. Method 400 automatically adapts to varying crop conditions to convey crops in a shorter time with a lesser likelihood of the harvester feeder becoming plugged with excessive crop material. Although the example method 400 is described in the context of being carried out by harvester feeder 320 as part of harvester 300 described above, it should be appreciated that method 400 may likewise be carried out with harvester feeders 20, 120 in 220 as well as any of the harvester feeders disclosed herein or with other similar harvester feeders or other harvesters.

As indicated by block 404, crop material is directed to an inlet of a crop passage of a harvester feeder, such as harvester feeder 320. In one implementation, such direction involves transversely conveying crop material from both sides of harvester feeder 320 two harvester feeder 320 with a draper belts or augers located forward of and on both sides of harvester feeder 320.

As indicated by block 408, driving a belt having a lower portion adjacent the crop passage is driven so as to engage and convey to crop processing/threshing components of the harvester. In some implementations, the belt may itself or in combination is other belts, form a substantially uninterrupted crop engaging belt surface extending across a majority of the width of the crop passage of the harvester feeder.

As indicated by block 412, a massager or other structure resiliently resins against an inner surface of the lower portion of the belt to resiliently press an outer surface of the lower portion against the crop material in the crop passage. This resilient force tends to compress and/or spread the underlying crop material, facilitating his passage through the crop passage with fewer plugs or jams. The resilient nature of the force automatically adapts to varying volumes, densities or amounts of crop material within the crop passage.

Figure 9:
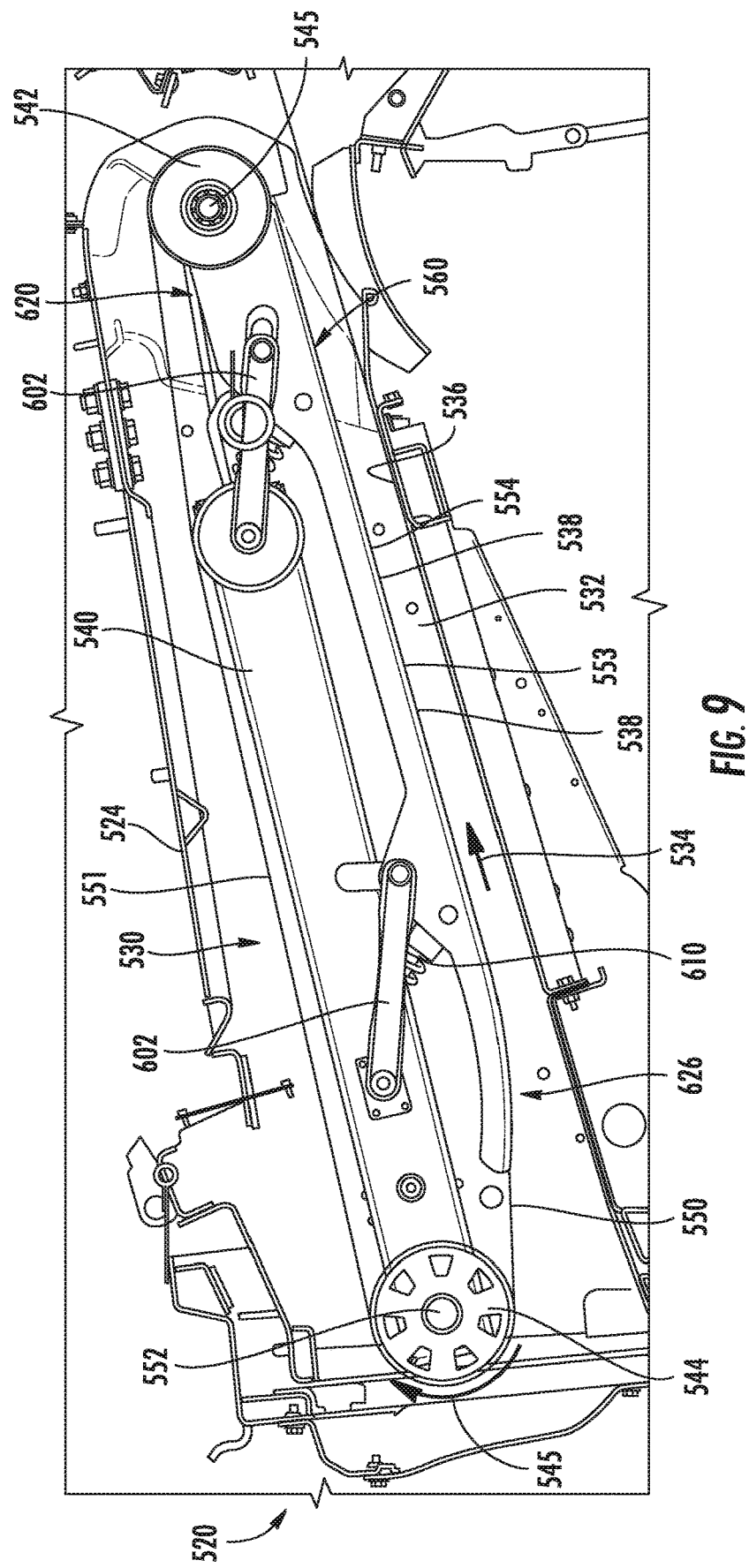
FIG. 9 is a sectional view illustrating portions of an example harvester feeder.
Figure 10:
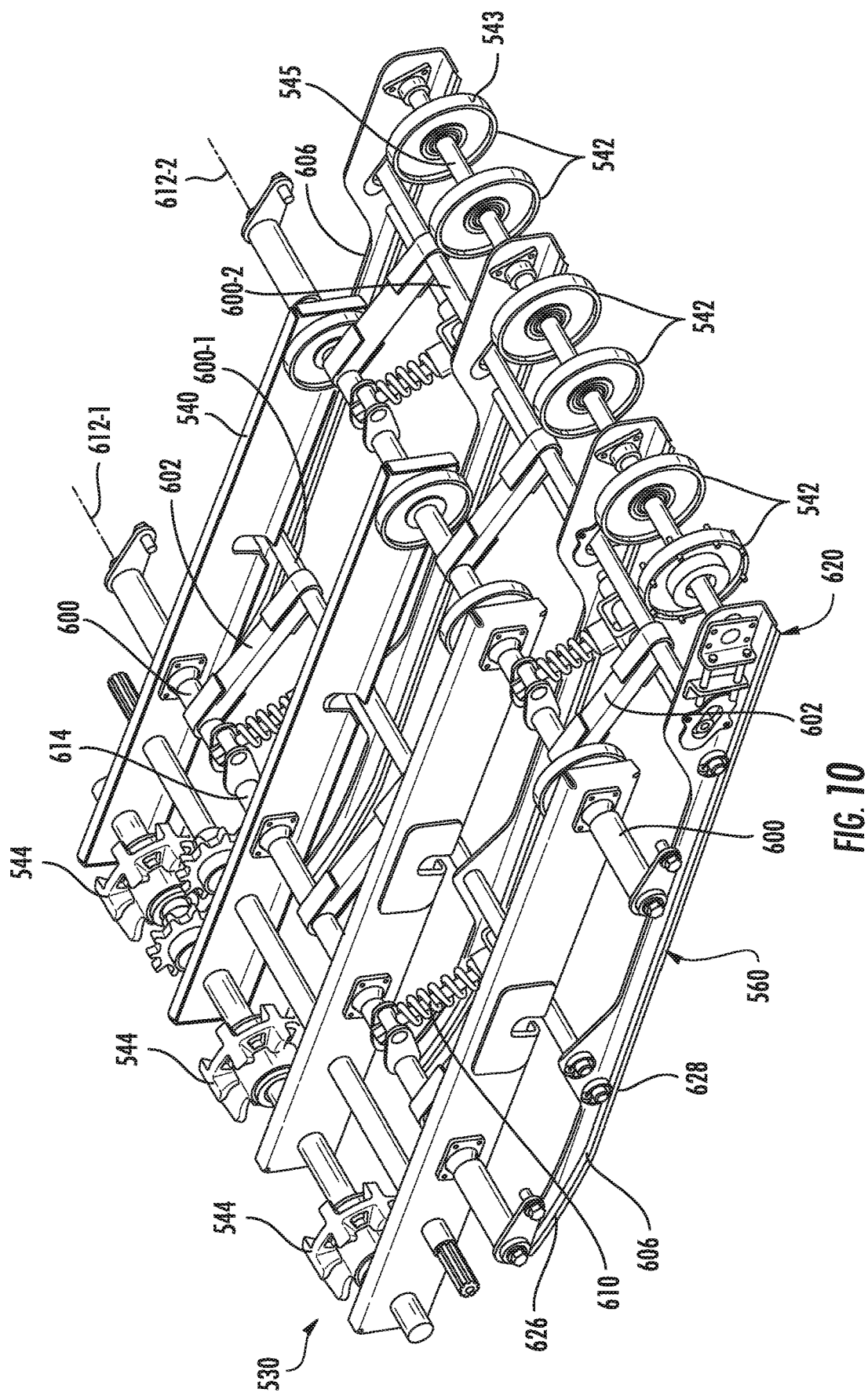
FIG. 10 is a top perspective view illustrating portions of an example conveyor of the harvester feeder of FIG. 9.
Figure 77A:
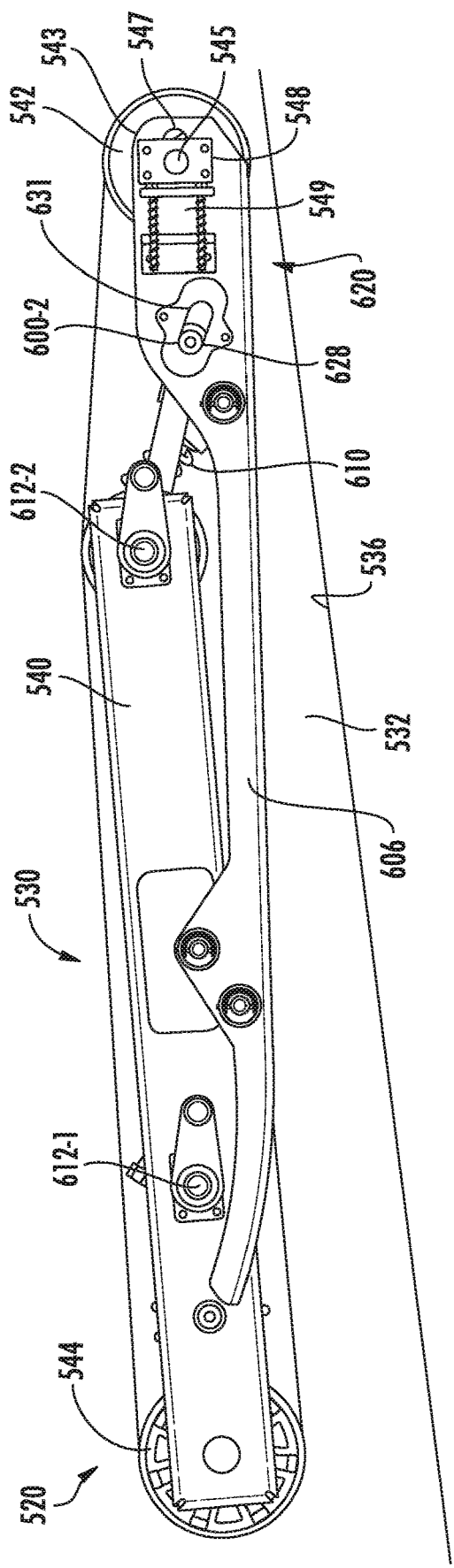

FIGS. 9 and 10 illustrate portions of an example harvester feeder 520. In one implementation, harvester feeder 520 is part of harvester 300, being utilized in place of harvester feeder 320. As with the above-described harvester feeders, harvester feeder 520 compresses and flattens agglomerations of crop material in the crop passage to spread out such agglomerations and reduce plugging. Harvester feeder 520 automatically adapts to varying crop conditions to convey crops in a shorter time with a lesser likelihood of the harvester feeder becoming plugged with excessive crop material. Harvester feeder 520 comprises housing 524 and conveyor 530.

Housing 524 comprises a framework and set of panels that form a crop passage 532 through and along which crops are conveyed in a direction as indicated by arrow 534. In one implementation, crop passage 532 has a lower boundary formed by a floor 536 and an upper boundary 538 formed by conveyor 530. In one implementation, floor 536 is stationary. In another implementation, floor 536 may itself comprise a conveying mechanism such as a chain or belt.

Conveyor 530 is supported by housing 524 and extends above the crops being conveyed along crop passage 532. Conveyor 530 comprises frame 540, forward tensioners 542, drive sprockets 544, at least one belt 550 and crop massager 560. Frame 40 comprises a bracket or other structure that supports forward tensioners 542 and crop massager 560.

Figure 11B:
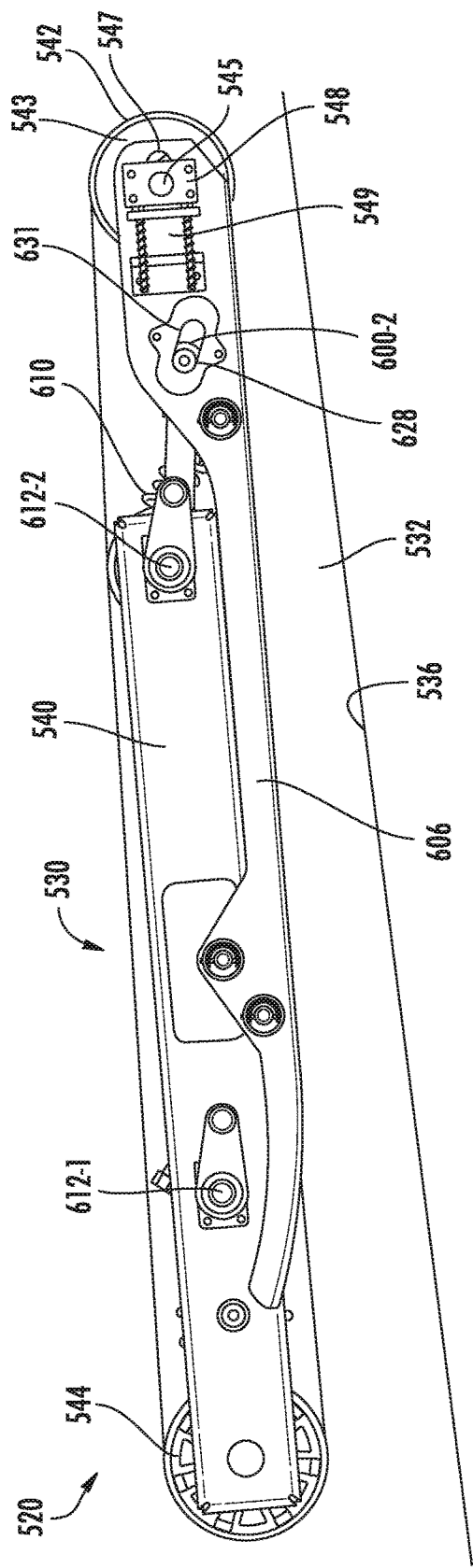
Figure 11C:
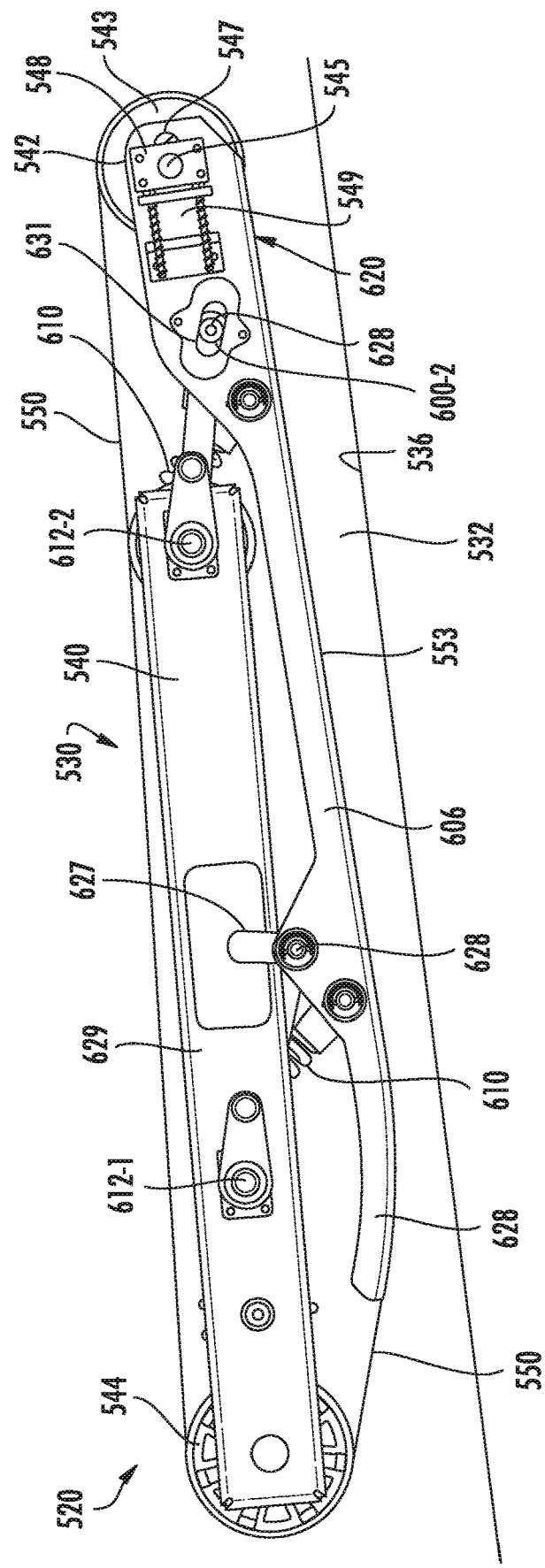

Forward tensioners 542 are located within the loop of the at least one belt 550 and exerts forces on an interior surface of the loop to place the at least one belt 550 in tension. In the example illustrated, forward tensioners 42 are movably supported to adjust tensioning about 50 so as to maintain belt 50 within a predetermined range of tensions. In the example illustrated, each of forward tensioners 542 comprises a wheel or disc 543 that idles and that is rotatably supported by shaft 545. Each of forward tensioners 542 is movable in a fore-aft direction to adjust the tension of the at least one belt 550. As shown by FIGS. 11A-11C, in one implementation, shaft 545 is slidably received within an elongated channel or slot 547 and is rotatably supported by a movable bracket 548 that is resiliently biased by a compression spring 549 in a forward direction.

Drive sprockets 44 each comprise a sprocket or other member in engagement with the at least one belt 550 to rotatably drive the loop of the at least one belt 550 in a direction indicated by arrow 534 and about forward tensioners 542. In one implementation, each of drive sprockets 544 may comprise external teeth which interact with corresponding logs or pockets in belt(s) 550. In the example illustrated, drive sprocket 544 is located at a rear of conveyor 530, proximate to the interior crop processing components or threshing components of the harvester, whereas each forward tensioner 542 is at a forward or front-end of conveyor 530. In other implementations, this relationship may be reversed.

The belt 550 or each of the belts 550 comprises a sheet or panel of a flexible bendable material wrapped about forward tensioners 542 and drive sprockets 44 in an unending loop. In one implementation, each belt 550 is formed from an elastomeric, rubber or rubber-like material. In one implementation, belt 550 may carry bars, cleats or other structures along its exterior surface for engaging crop material within crop passage 532. Belt 550, alone or in combination with other belts 550, forms a substantially uninterrupted crop engaging belt surface 554 which forms the upper boundary 538 of crop passage 532 and which extends across a majority of a width (as measured in a direction parallel to the rotational axis 552 of drive sprockets 544) of the crop passage 532. In some implementations, crop engaging belt surface 554 extends across at least 75% of the width of crop passage 532. In yet other implementations, crop engaging belt surface 554 extends across at least 90% of the width of crop passage 532. As a result of its expansive extent of crop engaging belt surface 554 is able to convey crops in a quieter and gentler manner as compared to typical chain conveyors.

Crop massager 560 comprises at least one crop massaging unit or element that resiliently presses against an inner surface of a lower portion of belt 50 to resiliently press an outer surface of the lower portion of belt 50 against crop material in crop passage 32. As shown by FIG. 9, belt 550 has an upper portion 551 that spans between forward tensioner 542 and drive sprocket 544 and a lower portion 553 that spans between forward tensioners 542 and drive sprocket 544 adjacent crop passage 532). Crop massager 560 is generally located between the upper portion 551 and the lower portion 553.

Because crop massager 560 resiliently presses the lower portion 553 against the crops within crop passage 532, crop massager 560 spreads out or flattens any lumps or bunches of crop material in crop passage 532. At the same time, the resilient nature of crop massager 560 allows crop massager 562 automatically adjust and respond to different volumes of crop material currently passing through crop passage 532. In one implementation, crop massager 560 utilizes springs, such as torsion springs or compression springs to apply resilient force to the lower portion 553 of belt 550. In some implementations, crop massager 560 utilizes hydraulic or pneumatic cylinder-pistons or shocks to apply such resilient forces.

FIG. 10 illustrates conveyor 530 without the at least one belt 550 to better illustrate crop massager 560. As shown in FIG. 10, crop massager 560 comprises skid cross supports 600-1, 600-2 (collectively referred to as skid cross supports 600), skid pivot arms 602, skids 606 and skid biases 610. Skid cross supports 600 comprise tubes, bars or other structures transversely extending across conveyor 530 and interconnecting each of the transversely spaced skids 606. Each of skid cross supports 600 is rotatably journaled to skids 606 such that skid 606 may rotate relative to skid cross supports 600. As shown by FIG. 11A, skid cross support 600-2 is rotatably and slidably received within an elongated slot 631 which extends in an upwardly angled direction towards the rear of conveyor 530 to facilitate vertical movement of a front portion 620 of each of skids 606 independent of movement of a rear portion 626 of skid 606. Skid pivot arm 602 pivotally support skid cross supports 600 and the carried skid 606 for pivotal movement about respective axes 612. In one implementation, each of skid pivot arm 602 is connected at one end to a skid cross supports 600, along the skid cross supports 600 to rotate relative to the skid pivot arm 602. A second opposite end of the skid pivot arm 602 is rotatably journal to a crossbar 614 that is supported by frame 540.

Skids 606 comprise blades, skis or runners having an elongated shape with a flat lower surface that abuts an interior surface of the lower portion 553 of belt 550. Each of skid 606 has a front portion 620 supporting forward tensioners 542 and a rearward portion 622 that curves upwardly towards frame 540. Each of skid 606 is pivotably connected to at least one skid cross supports 600. As a result, each of skids 606 may pivot about axes 612 and may further pivot about the axes 628 of the skid cross supports 600. In the example illustrated, skids 606 move in unison with one another and are transversely spaced to define the boundaries of an area that encompasses a majority of the area of lower portion 553 of belt 550. In the example illustrated, skids 606 extend across and overall area that encompasses at least 75%, in one implementation, at least 90% of the area of lower portion 553 about 550.

Skid biases 610 extend between crossbars 614 and a cross supports 600. Skid by 610 as only bias skid cross supports 600 and skids 606 in a downward pivoting direction towards crop passage 532. In the example illustrated, skid biases 610 each comprise a compression spring that is compressed in response to the skid pivoting in an upward direction. In other implementations, skid by 610 may comprise hydraulic or pneumatic shocks or pistons.

FIGS. 11A-11C illustrate various positions of skids 606. FIG. 11A illustrates skids 606 in an intermediate state in which the front portion 620 is pivoted downward about axis 612-2 while the rear portion 626 remains raised or elevated. In such a state, cross supports 600-1 is received within a slot 627 formed in each of the bars 629 of frame 540. Slot 627 facilitates a greater degree of motion for skid 606.

FIG. 11B illustrates a fully elevated state in which both rear portion 620 and front portion 626 of skid 606 is fully raised. FIG. 11C illustrates a fully lowered state in which both front portion 620 and rear portion 626 are fully raised with respect to crop passage 532. In the fully lowered state, each of skids works to compress or spread out smaller volumes of mass that may have accumulated in certain spots beneath lower portion 553 of belt 550. As shown by FIGS. 11A and 11B, rear portion 626, front portion 620 are both may pivot up and down to accommodate changes in the height of crop material being conveyed along floor 536 in crop passage 532.

Figure 12:
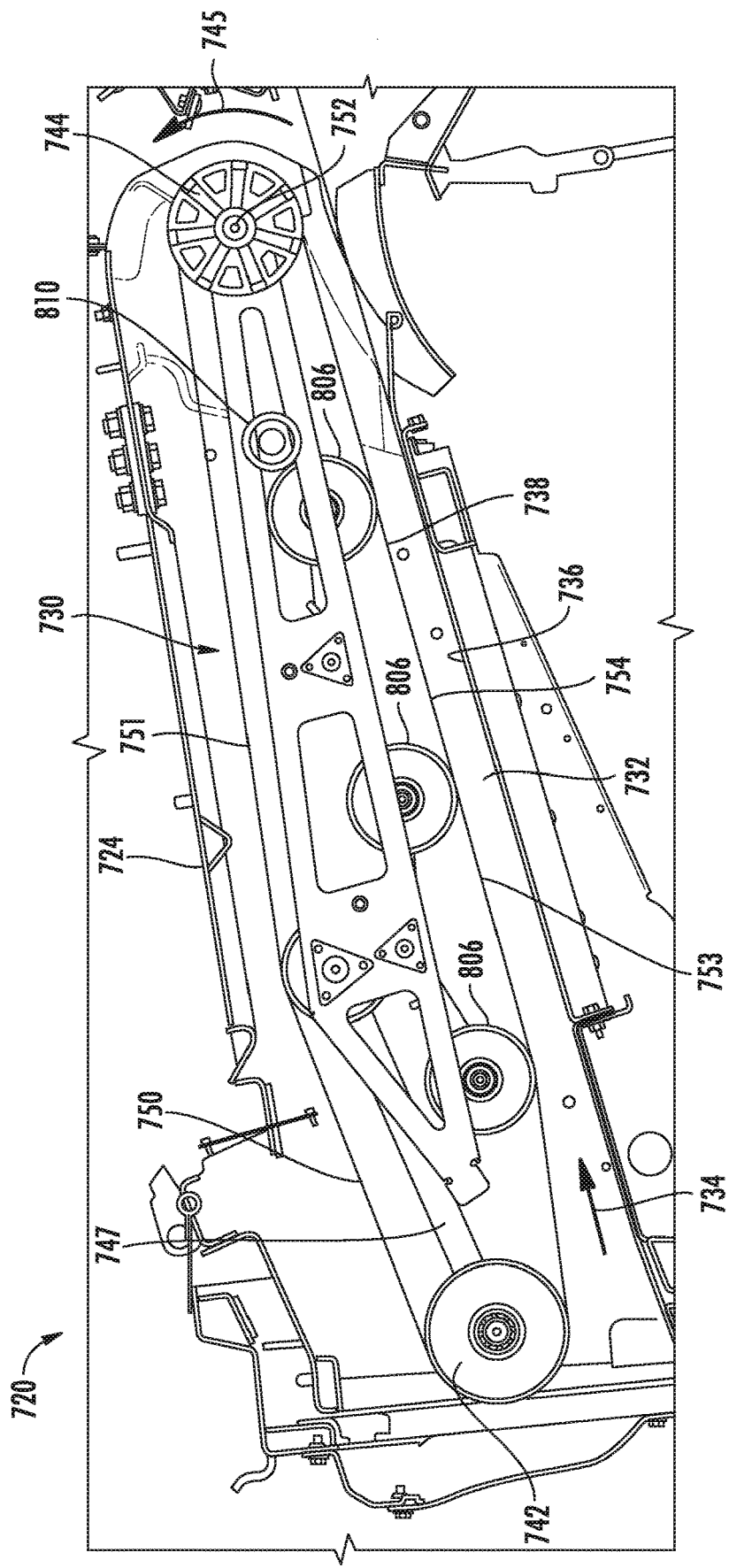
FIG. 12 is a sectional view illustrating portions of an example harvester feeder.
Figure 13:
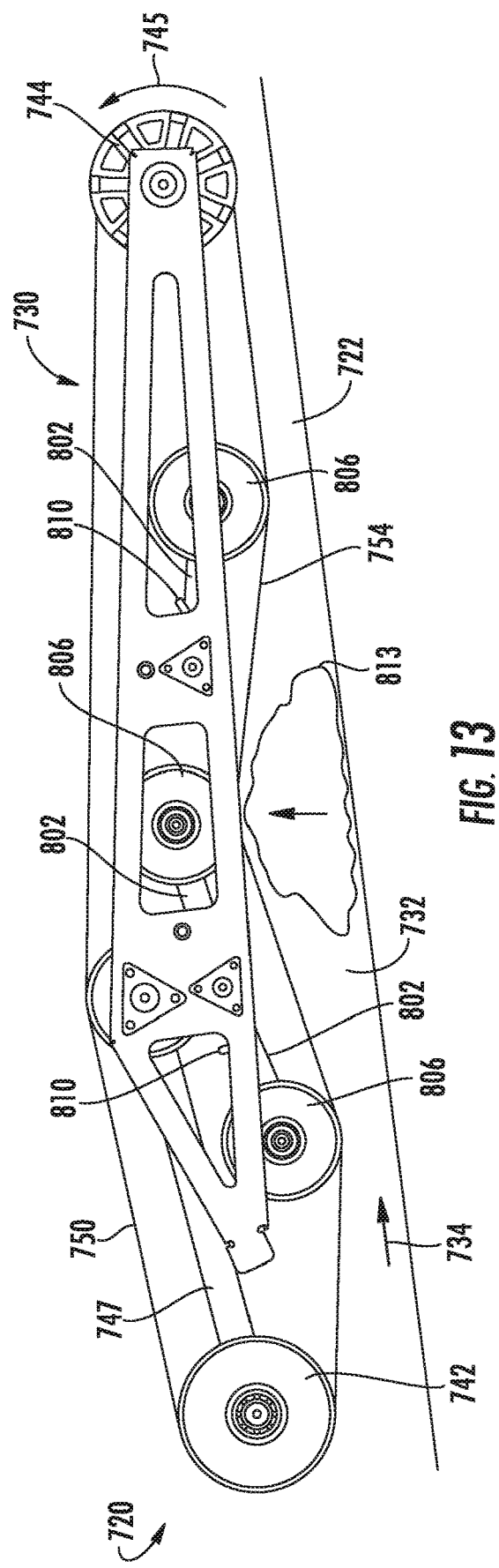
FIG. 13 is a sectional view of the harvester feeder of FIG. 12 during conveyance of crop material.
Figure 14:
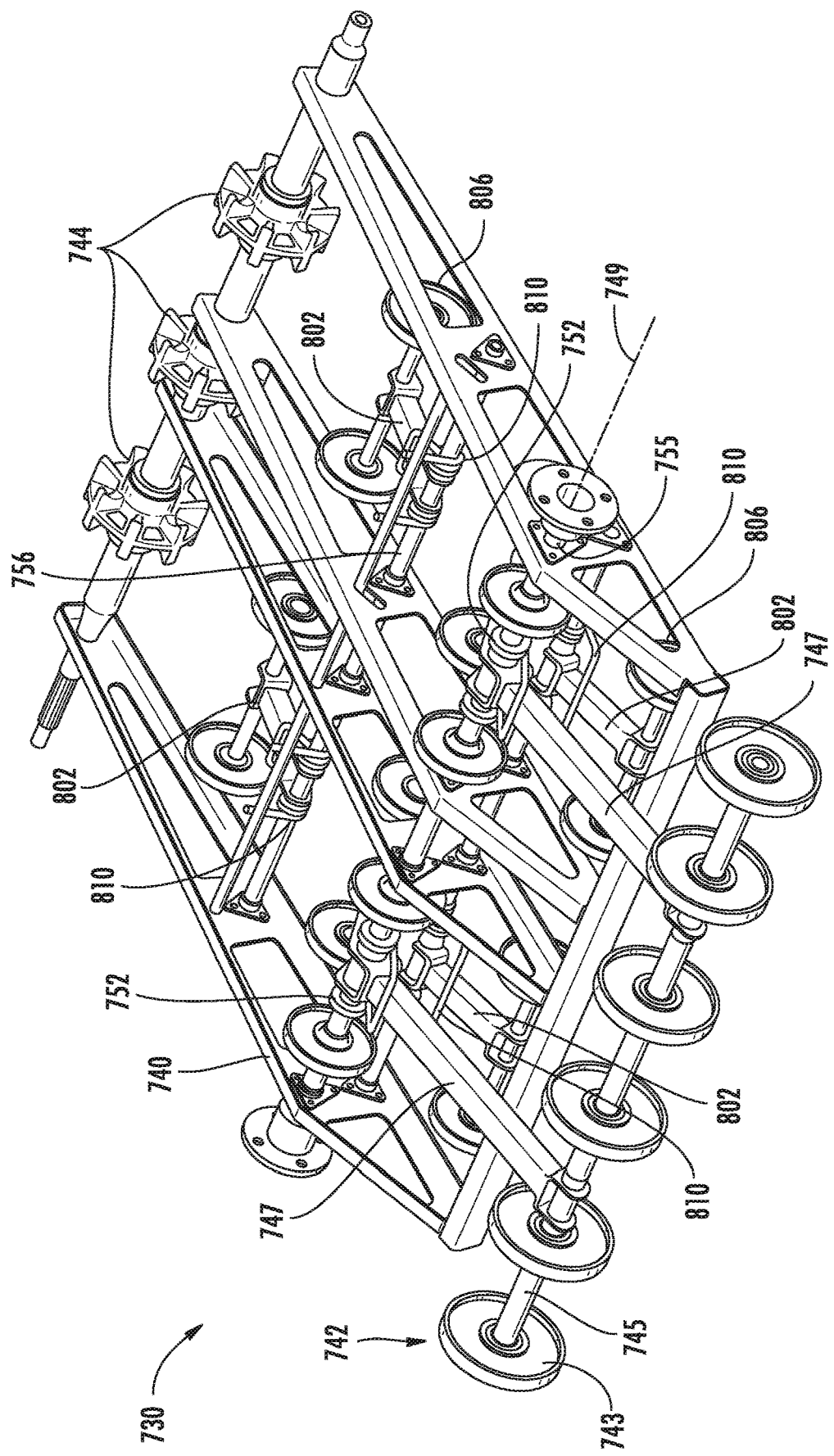
FIG. 14 is a top perspective view illustrate portions of an example conveyor of the harvester feeder of FIG. 12.
Figure 15:
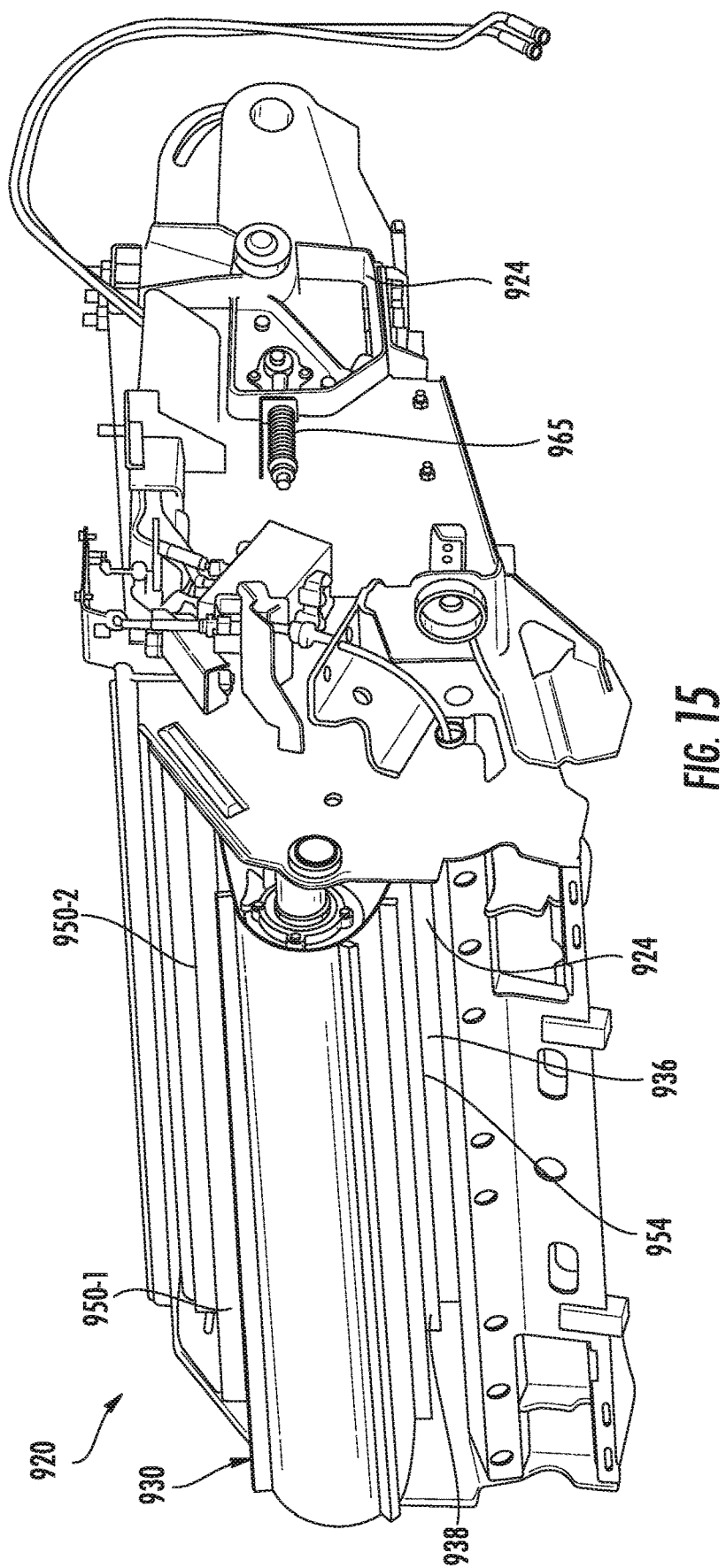
FIG. 15 is a front perspective view illustrating portions of an example harvester feeder.

FIGS. 12-14 illustrate portions of an example harvester feeder 720. In one implementation, harvester feeder 720 is part of harvester 300, being utilized in place of harvester feeder 320. As with the above-described harvester feeders, harvester feeder 720 compresses and flattens agglomerations of crop material in the crop passage to spread out such agglomerations and reduce plugging. Harvester feeder 720 automatically adapts to varying crop conditions to convey crops in a shorter time with a lesser likelihood of the harvester feeder becoming plugged with excessive crop material. Harvester feeder 720 comprises housing 724 and conveyor 730.

Housing 724 comprises a framework and set of panels that form a crop passage 732 through and along which crops are conveyed in a direction as indicated by arrow 734. In one implementation, crop passage 732 has a lower boundary formed by a floor 736 and an upper boundary 738 formed by conveyor 730. In one implementation, floor 736 is stationary. In another implementation, floor 736 may itself comprise a conveying mechanism such as a chain or belt.

Conveyor 730 is supported by housing 724 and extends above the crops being conveyed along crop passage 732. Conveyor 730 comprises frame 740, forward tensioners 742, drive sprockets 744, at least one belt 750 and crop massager 760. Frame 740 comprises a bracket or other structure that supports forward tensioners 742 and crop massager 760.

Forward tensioners 742 are located within the loop of the at least one belt 750 and exerts forces on an interior surface of the loop to place the at least one belt 750 in tension. In the example illustrated, forward tensioners 742 are movably supported to adjust tensioning of belt 750 so as to maintain belt 750 within a predetermined range of tensions. In the example illustrated, each of forward tensioners 742 comprises a wheel or disc 743 that idles and that is rotatably supported by shaft 745. Shaft 745 is supported by a forward tensioner arm 747, wherein each of arms 747 pivots about axis 749 provided by a cross supports 755. Each forward tensioner arm 747 is regionally biased about axis 749 in a downward direction by a torsion spring 752.

Drive sprockets 744 each comprise a sprocket or other member in engagement with the at least one belt 750 to rotatably drive the loop of the at least one belt 750 in a direction indicated by arrow 734 and about forward tensioners 742. In one implementation, each of drive sprockets 744 may comprise external teeth which interact with corresponding logs or pockets in belt(s) 750. In the example illustrated, drive sprocket 744 is located at a rear of conveyor 730, proximate to the interior crop processing components or threshing components of the harvester, whereas each forward tensioner 742 is at a forward or front-end of conveyor 730. In other implementations, this relationship may be reversed.

The belt 750 or each of the belts 750 comprises a sheet or panel of a flexible bendable material wrapped about forward tensioners 742 and drive sprockets 744 in an unending loop. In one implementation, each belt 750 is formed from an elastomeric, rubber or rubber-like material. In one implementation, belt 750 may carry bars, cleats or other structures along its exterior surface for engaging crop material within crop passage 732. Belt 750, alone or in combination with other belts 750, forms a substantially uninterrupted crop engaging belt surface 754 which forms the upper boundary 738 of crop passage 732 and which extends across a majority of a width (as measured in a direction parallel to the rotational axis 752 of drive sprockets 744) of the crop passage 732. In some implementations, crop engaging belt surface 754 extends across at least 75% of the width of crop passage 732. In yet other implementations, crop engaging belt surface 754 extends across at least 90% of the width of crop passage 732. As a result of its expansive extent of crop engaging belt surface 754 is able to convey crops in a quieter and gentler manner as compared to typical chain conveyors.

Crop massager 760 comprises at least one crop massaging unit or element that resiliently presses against an inner surface of a lower portion of belt 750 to resiliently press an outer surface of the lower portion of belt 750 against crop material in crop passage 732. As shown by FIG. 12, belt 750 has an upper portion 751 that spans between forward tensioner 742 and drive sprocket 744 and a lower portion 753 that spans between forward tensioners 742 and drive sprockets 744 adjacent crop passage 732). Crop massager 760 is generally located between the upper portion 751 and the lower portion 753.

Because crop massager 760 resiliently presses the lower portion 753 against the crops within crop passage 732, crop massager 760 spreads out or flattens any lumps or bunches of crop material in crop passage 732. At the same time, the resilient nature of crop massager 760 allows crop massager 762 automatically adjust and respond to different volumes of crop material currently passing through crop passage 732. In one implementation, crop massager 760 utilizes springs, such as torsion springs or compression springs to apply resilient force to the lower portion 753 of belt 750. In some implementations, crop massager 760 utilizes hydraulic or pneumatic cylinder-pistons or shocks to apply such resilient forces.

FIG. 14 illustrates conveyor 730 without the at least one belt 750 to better illustrate crop massager 760. As shown in FIG. 14, crop massager 760 comprises cross supports 755 and 756, pivot arms 802, idler wheels 806 and idler wheel biases 810. Cross supports 755, 756 comprise tubes, bars or other structures transversely extending across conveyor 730 and pivotably supporting each of the transversely spaced pivot arms 802. Idler wheel pivot arms 802 rotatably support idler wheels 806 which roll along and in contact with an interior surface of lower portion 753 of belt 750.

Idler wheel biases 810 extend between a respective one of cross supports 755, 756 and a respective pivot arm 802. Idler wheel biases 610 resiliently bias idler wheels 806 in a downward pivoting direction towards crop passage 732. In the example illustrated, idler wheel biases 810 each comprise a torsion spring that is compressed in response to the pivot arm 802 and carried either wheels 806 pivoting in an upward direction. In other implementations, idler wheel bias 810 may comprise hydraulic or pneumatic shocks or pistons.

FIG. 13 illustrates an agglomeration of crop material 813 being conveyed within crop passage 732 by conveyor 730. As shown by FIG. 13, the pile or mass of crop material 813 exert safe upward force against an opposing idler wheel 806 and against the spring force provided by the respective either will bias 810. In turn, the late 06 exerts a downward force upon the pile of crop material 813, tending to compress or spread the pile of crop material 813. This compression or spreading reduces the likelihood of the pile of crop material 813 forming a plug within crop passage 732.

FIGS. 15-18 illustrate portions of an example harvester feeder 920. In one implementation, harvester feeder 920 is part of harvester 300, being utilized in place of harvester feeder 320. As with the above-described harvester feeders, harvester feeder 720 compresses and flattens agglomerations of crop material in the crop passage to spread out such agglomerations and reduce plugging. Harvester feeder 920 automatically adapts to varying crop conditions to convey crops in a shorter time with a lesser likelihood of the harvester feeder becoming plugged with excessive crop material. Harvester feeder 920 comprises housing 924 and conveyor 930.

Housing 924 comprises a framework and set of panels that form a crop passage 932 through and along which crops are conveyed in a direction as indicated by arrow 934. In one implementation, crop passage 932 has a lower boundary formed by a floor 936 and an upper boundary 938 formed by conveyor 930. In one implementation, floor 936 is stationary. In another implementation, floor 936 may itself comprise a conveying mechanism such as a chain or belt.

Conveyor 930 is supported by housing 924 and extends above the crops being conveyed along crop passage 932. Conveyor 930 comprises frame 940, forward tensioners 942, drive sprockets 944, belts 950-1, 950-2 (collectively referred to as belts 950) and crop massagers 960-1, 960-2. Frame 940 comprises a bracket or other structure that supports forward tensioner 942 and crop massagers 960.

Forward tensioner 942 are located within the loop of belts 950 and exerts forces on an interior surface of the loop to place belts 950 in tension. In the example illustrated, forward tensioner 942 is movably supported to adjust tensioning of belts 950 so as to maintain belts 950 within a predetermined range of tensions. In the example illustrated, forward tensioner 942 comprises a floating drum that idles and that is rotatably supported by pivot arm 945. Pivot arm 945 is pivotably supported by translatable arm 947. Translatable arm 947 is translatable in fore and aft directions, sliding within a support bracket 949 which is secured to frame 940.

Figure 16:
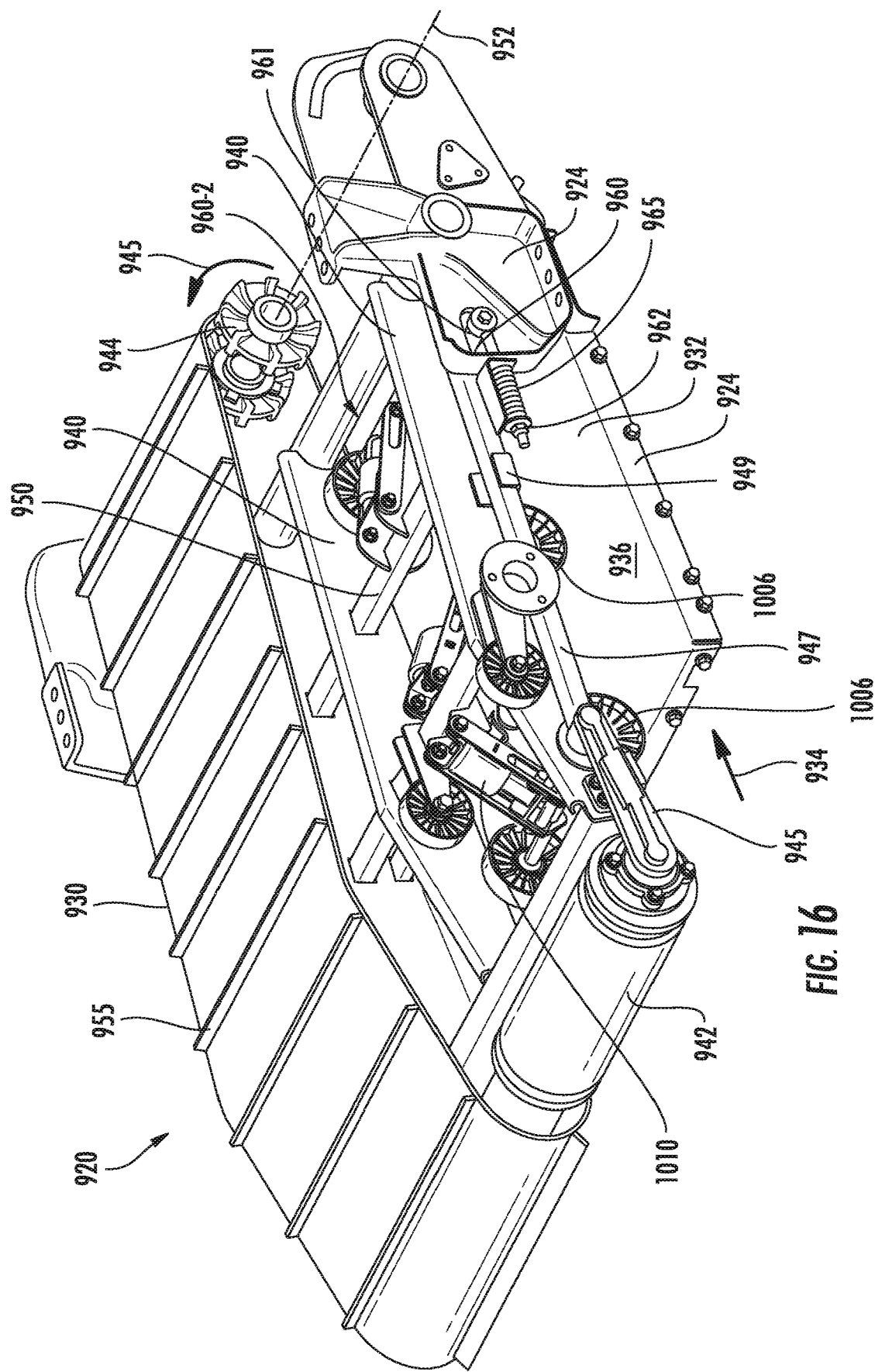
FIG. 16 is a top perspective view of the harvester feeder of FIG. 15 with portions omitted for purposes of illustration.
Figure 17:
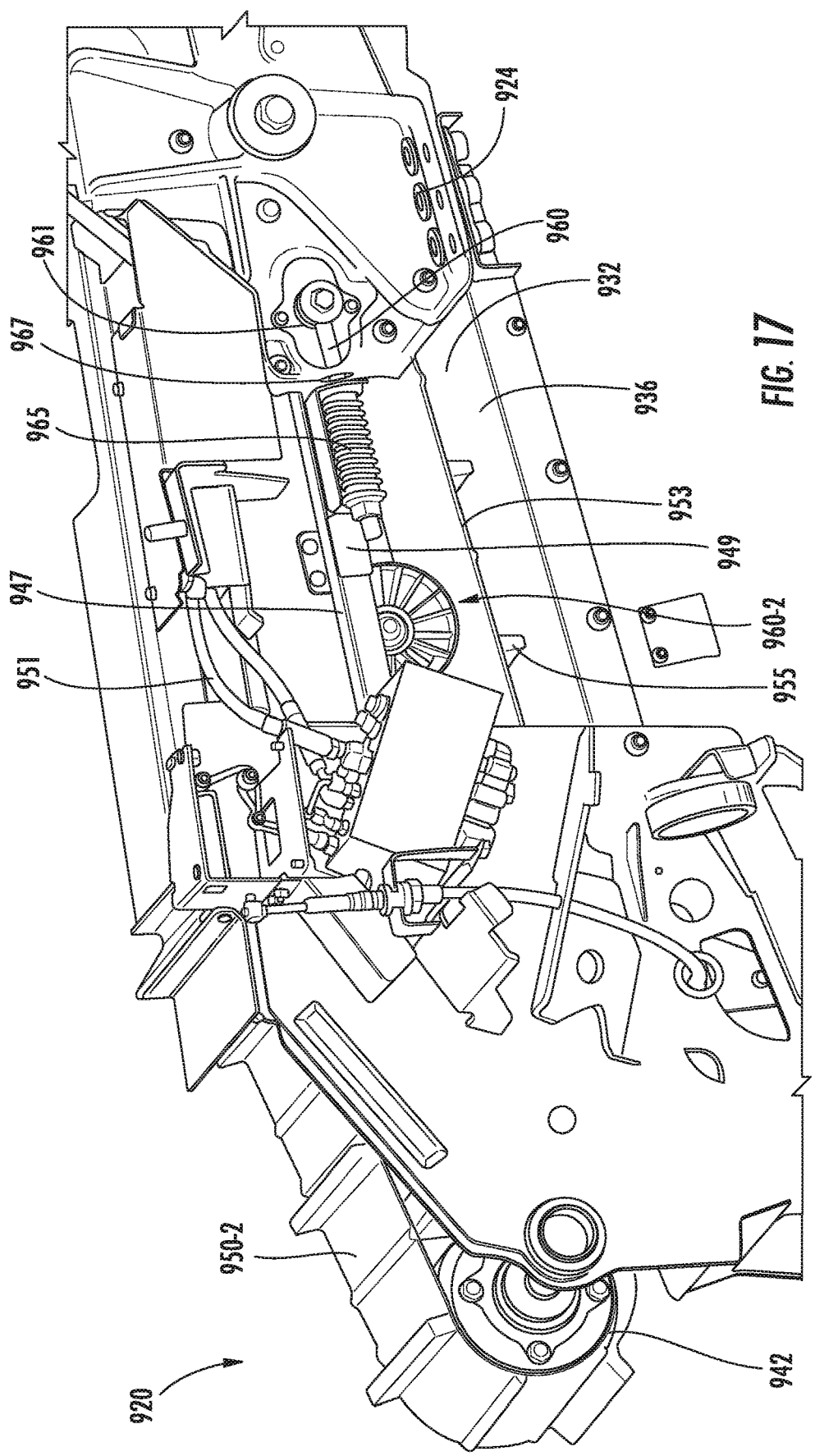
FIG. 17 is a perspective view of the harvester feeder of FIG. 15 with portions omitted for purposes of illustration.

As shown by FIGS. 16 and 17, translatable arm 947 comprises an extension 960 that extends through a fore-aft elongated slot 961 in housing 924. Extension 956 further comprises a shaft portion extending in a forward direction and terminating at a head 963. Extension 960, translatable arm 947 and the carried forward tensioner 942 are each resiliently biased in a forward direction by a compression spring 957 captured between head 963 and a bracket portion 967 of housing 924 which is located rearward of head 963. Rearward movement of head 963 resulting from rearward movement of forward tensioner 942 resulting compression of spring 965.

Drive sprockets 944 each comprise a sprocket or other member in engagement with belts 950 to rotatably drive the loops of belts 950 in a direction indicated by arrow 934 and about forward tensioner 942. In one implementation, each of drive sprockets 944 may comprise external teeth which interact with corresponding lugs or pockets in belt(s) 950. In the example illustrated, drive sprockets 944 are located at a rear of conveyor 930, proximate to the interior crop processing components or threshing components of the harvester, whereas each forward tensioner 942 is at a forward or front-end of conveyor 930. In other implementations, this relationship may be reversed.

Each of belts 950 comprises a sheet or panel of a flexible bendable material wrapped about forward tensioner 942 and drive sprockets 944 in an unending loop. In one implementation, each belt 950 is formed from an elastomeric, rubber or rubber-like material. In one implementation, belts 950 may each carry bars, cleats or other structures 955 along its exterior surface for engaging crop material within crop passage 932. Belts 950 cooperate to form a substantially uninterrupted crop engaging belt surface 954 which forms the upper boundary of crop passage 932 and which extends across a majority of a width (as measured in a direction parallel to the rotational axis 953 of drive sprockets 944) of the crop passage 932. In some implementations, crop engaging belt surface 954 extends across at least 75% of the width of crop passage 932. In yet other implementations, crop engaging belt surface 954 extends across at least 90% of the width of crop passage 932. As a result of its expansive extent of crop engaging belt surface 954 is able to convey crops in a quieter and gentler manner as compared to typical chain conveyors.

Crop massager 960 comprises at least one crop massaging unit or element that resiliently presses against an inner surface of a lower portion of belt 950 to resiliently press an outer surface of the lower portion of belts 950 against crop material in crop passage 932. As shown by FIG. 17, belt 950 has an upper portion 951 that spans between forward tensioner 742 and drive sprocket 944 and a lower portion 953 that spans between forward tensioners 942 and drive sprockets 944 adjacent crop passage 932). Crop massager 960 is generally located between the upper portion 951 and the lower portion 953.

Because crop massager 760 resiliently presses the lower portion 953 against the crops within crop passage 932, crop massagers 960 spread out or flatten any lumps or bunches of crop material in crop passage 932. At the same time, the resilient nature of crop massager 960 allows crop massager 960 to automatically adjust and respond to different volumes of crop material currently passing through crop passage 932. In one implementation, crop massager 960 utilizes springs, such as torsion springs or compression springs to apply resilient force to the lower portion 953 of belt 950. In some implementations, crop massagers 960 utilize hydraulic or pneumatic cylinder-pistons or shocks to apply such resilient forces.

Figure 18:
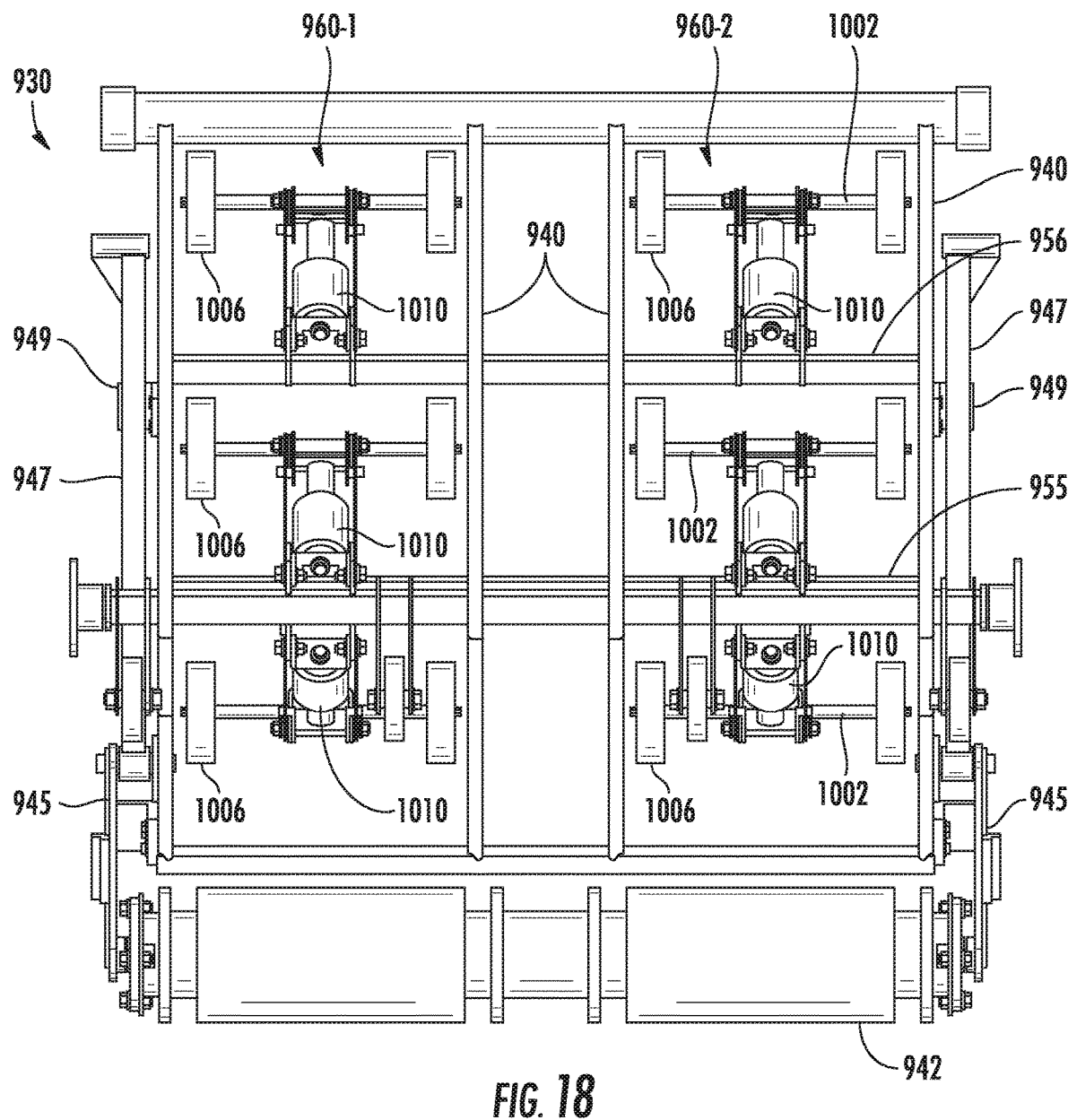
FIG. 18 is a top view of portions of an example conveyor of the example harvester feeder of FIG. 15.
Figure 19:
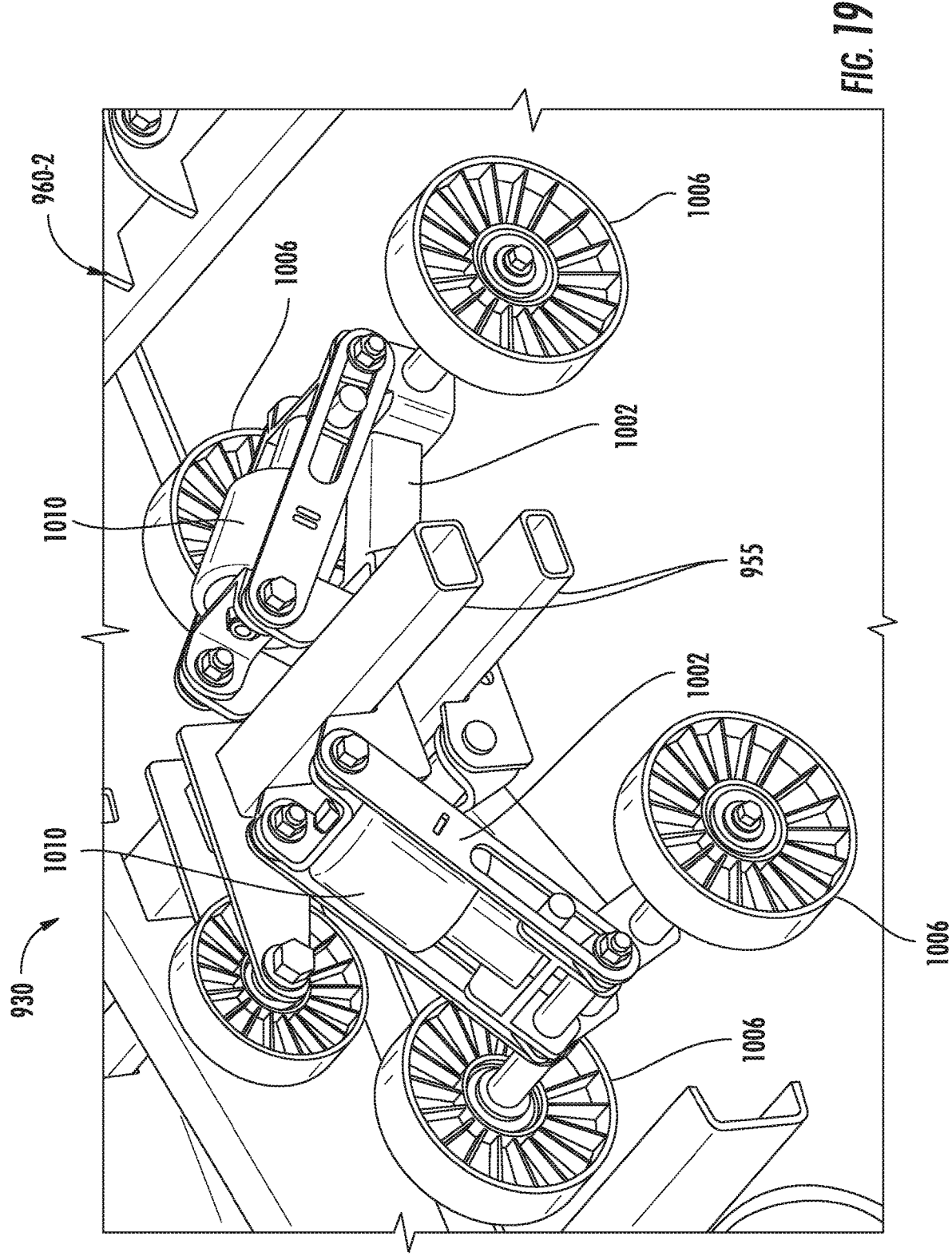
FIG. 19 is a fragmentary and large perspective view of portions of the conveyor of FIG. 18 illustrating portions of an example crop massager.

FIG. 18 illustrates conveyor 930 without the belts 950 to better illustrate crop massagers 960. As shown in FIG. 18, crop massagers 960 comprise cross supports 955, pivot arms 1002, idler wheels 1006 and idler wheel biases 1010. Cross supports 955 comprise tubes, bars or other structures transversely extending across conveyor 930 and pivotably supporting each of the transversely spaced pivot arms 1002. As shown by FIG. 19, idler wheel pivot arms 1002 rotatably support idler wheels 1006 which roll along and in contact with an interior surface of lower portion 953 of belts 950. Idler wheels 1006 are spaced as pairs in an array across an area that extends over at least 50% of a width of crop passage 932 left in shown in FIG. 17), and in one implementation, over at least 75% as well as over 90% of the width and area of crop passage 932.

Idler wheel biases 1010 extend between cross supports 955 and a respective pivot arm 1002. Idler wheel biases 1010 resiliently bias idler wheels 1006 in a downward pivoting direction towards crop passage 932. In the example illustrated, idler wheel biases 1010 each comprise a pneumatic spring or shock that is compressed in response to the pivot arm 1002 and carried either wheels 1006 pivoting in an upward direction. In other implementations, idler wheel bias 1010 may comprise a hydraulic spring or shock, a compression spring or torsion spring.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harvester feeder comprising:
   a housing forming a crop passage having a width;
   a conveyor supported by the housing to extend above crops being conveyed along the crop passage, the conveyor comprising:
   a frame;
   at least one forward tensioner supported by the frame;
   at least one drive sprocket;
   at least one belt about the at least one forward tensioner and the at least one drive sprocket, the at least one belt forming a substantially uninterrupted crop engaging belt surface extending across a majority of the width, wherein the at least one belt has an upper portion spanning between the at least one forward tensioner and the drive sprocket and a lower portion spanning between the at least one forward tensioner and the at least one drive sprocket, the lower portion being adjacent the crop passage, the harvester feeder further comprising a crop massager between the upper portion and the lower portion, the crop massager resiliently pressing the lower portion of the continuous belt towards the crop passage, the crop massager comprising a plurality of independent crop massaging elements configured to undulate the lower portion of the at least one belt.

2. The harvester feeder of claim 1, wherein substantially uninterrupted crop engaging belt surface extends across at least 90% of the width in an uninterrupted fashion.

3. The harvester feeder of claim 1, wherein the crop massager directly contacts a face of the lower portion of the at least one belt.

4. The harvester feeder of claim 1, wherein each of the crop massaging elements comprises an idler wheel bearing against the lower portion and resiliently biased towards the crop passage.

5. The harvester feeder of claim 4, wherein the idler wheel is pivotably supported by the frame.

6. The harvester feeder of claim 5 further comprising a suspension member operably coupled between the frame and the idler wheel to resiliently bias the idler wheel towards the crop passage.

7. The harvester feeder of claim 1, wherein the conveyor further comprises:
   a resiliently biased fore and aft translatable arm supported by the frame; and
   a pivot arm pivotably connected to the fore and aft translatable arm and supporting the at least one forward tensioner.

8. The harvester feeder of claim 1, wherein the frame is fixed and extends between the upper portion and the lower portion of the continuous belt.

9. The harvester feeder of claim 1, wherein the at least one belt comprises a plurality of belts in a side edge-to-side edge relationship.

10. The harvester feeder of claim 1, wherein the crop massager is spaced from and is between the at least one forward tensioner and the at least one drive sprocket such that the crop massager resiliently presses a portion of the at least one belt that spans between the at least one forward tensioner and the at least one sprocket towards a crop passage.

11. The harvester feeder of claim 1, wherein the lower portion of the at least one belt comprises a span extending between the plurality of independent crop massaging elements that is bendable towards the upper portion.

12. A harvester feeder comprising:
a housing forming a crop passage having a width;
a conveyor supported by the housing to extend above crops being conveyed along the crop passage, the conveyor comprising:
a frame;
a forward tensioner supported by the frame;
a drive sprocket;
a belt about the forward tensioner and the drive sprocket, the belt having an upper portion spanning between the forward tensioner and the drive sprocket and a lower portion spanning between the forward tensioner and the drive sprocket, the lower portion being adjacent the crop passage; and
a crop massager between the upper portion and the lower portion, the crop massager resiliently pressing the lower portion of the continuous belt towards the crop passage, the crop massager comprising a plurality of independent crop massaging elements configured to undulate the lower portion of the at least one belt.

13. The harvester feeder of claim 12, wherein each of the crop massaging elements comprises an idler wheel bearing against the lower portion and resiliently biased towards the crop passage.

14. The harvester feeder of claim 13 further comprising a suspension member operably coupled between the frame and the idler wheel to resiliently bias the idler wheel towards the crop passage.

15. The harvester feeder of claim 12, wherein the conveyor further comprises:
a resiliently biased fore and aft translatable arm supported by the frame; and
a pivot arm pivotably connected to the fore and aft translatable arm and supporting the forward tensioner.

16. The harvester feeder of claim 12, wherein the frame is fixed and extends between the upper portion and the lower portion of the continuous belt.

17. The harvester feeder of claim 12, wherein the at least one forward tensioner is rotatable about a first axis, wherein the at least one drive sprocket is rotatable about a second axis and wherein the crop massager is movable relative to and in a direction perpendicular to a plane containing the first axis and the second axis.

18. The harvester feeder of claim 12, wherein the lower portion of the at least one belt comprises a span extending between the plurality of independent crop massaging elements that is bendable towards the upper portion.

19. A method for feeding crop material from a harvester head into a harvester, the method comprising:
directing the crop material to an inlet of a crop passage of a harvester feeder;
driving a belt about a pair of spaced axes, the belt having a lower portion between the spaced axes and adjacent the crop passage; and
resiliently pressing against an inner surface of the lower portion at a plurality of distinct locations with a plurality of independent crop massaging elements to resiliently press and undulate an outer surface of the lower portion against the crop material in the crop passage.

* * * * *